United States Patent
Levin et al.

(10) Patent No.: US 12,418,347 B2
(45) Date of Patent: Sep. 16, 2025

(54) SCALABLE RECEIVER ARCHITECTURE FOR SILICON PHOTONIC LINKS

(71) Applicant: Intel Corporation, Santa Clara, CA (US)

(72) Inventors: Itamar Levin, Holon (IL); Adee Ofir Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 17/556,696

(22) Filed: Dec. 20, 2021

(65) Prior Publication Data

US 2023/0198631 A1 Jun. 22, 2023

(51) Int. Cl.
*H04B 10/69* (2013.01)
*H04B 10/50* (2013.01)
*H04B 10/61* (2013.01)

(52) U.S. Cl.
CPC ....... *H04B 10/6971* (2013.01); *H04B 10/503* (2013.01); *H04B 10/614* (2013.01); *H04B 10/6932* (2013.01)

(58) Field of Classification Search
CPC .......................................... H04B 10/69–6973
See application file for complete search history.

(56) References Cited

U.S. PATENT DOCUMENTS

| | | | |
|---|---|---|---|
| 6,219,354 B1 * | 4/2001 | Fink | H04L 12/6418 370/537 |
| 9,438,409 B1 | 9/2016 | Liao et al. | |
| 2003/0223505 A1 * | 12/2003 | Verbin | H04L 25/03057 375/261 |
| 2004/0120422 A1 * | 6/2004 | Lin | H04L 27/3863 375/345 |
| 2007/0201544 A1 | 8/2007 | Zhu et al. | |
| 2012/0250785 A1 | 10/2012 | Vidal et al. | |

(Continued)

OTHER PUBLICATIONS

Agrawal, Ankur, et al., "A 19-GB/s Serial Link Receiver With Both 4-Tap FFE and 5-Tap DFE Functions in 45-nm SOI CMOS", IEEE Journal of Solid-State Circuits, vol. 47, No. 12, Dec. 2012, 12 pgs.

(Continued)

*Primary Examiner* — Nathan M Cors
(74) *Attorney, Agent, or Firm* — Essential Patents Group, LLP

(57) ABSTRACT

Sampling circuitry for receiving an analog signal from photodetector circuitry and generating a sample analog signal. Equalization circuitry for generating an equalized signal comprising first and second sample values corresponding with a cursor tap and a first postcursor tap, and one or more third sample values corresponding with taps other than the cursor tap and the first postcursor tap. In the equalized signal, amplitudes of the first and second sample values are substantially equal while the third sample values are attenuated relative to the first and second sample values. The first and second sample values correspond with two or more first symbols of a first alphabet. Data slicer and modulo circuitry to generate a data signal based on the equalized signal and perform a modulo operation on the two or more first symbols and to generate one or more second symbols. The second symbols are according to a second alphabet.

20 Claims, 10 Drawing Sheets

(56) References Cited

U.S. PATENT DOCUMENTS

2021/0126764 A1* 4/2021 Beukema .......... H04L 25/03038
2021/0152404 A1 5/2021 Levin et al.
2022/0360476 A1* 11/2022 Palusa .................... H03K 5/135

OTHER PUBLICATIONS

Ozkaya, Ilter, et al., "A 64-Gb/s 1.4pJ/b NRZ Optical Receiver Data-Path in 14-nm CMOS FinFET", IEEE Journal of Solid-State Circuits, vol. 52, No. 12, Dec. 2017, 16 pgs.
Extended European Search Report from European Patent Application No. 22206895.9 notified May 22, 2023, 13 pgs.
Jeong, Gyu-Seob, et al., "A Modulo-FIR Equalizer for Wireline Communications", IEEE Transactions on Circuits and Systems-I: Regular Papers, vol. 66, No. 11, Nov. 2019, 9 pgs.
Kang, Byungjun, et al., "A 10 Gb/s PAM-4 Transmitter With Feed-Forward Implementation of Tomlinson-Harashima Precoding in 28 nm CMOS", IEEE Access, vol. 9, 2021, 10 pgs.

* cited by examiner

SCALABLE RECEIVER ARCHITECTURE FOR SILICON PHOTONIC LINKS

FIELD

The present disclosure relates to a receiver and transmitter, in particular to, a SerDes (serializer/deserializer) transceiver for an electro-optical communication system.

BACKGROUND

An electro-optical communication system includes a transmitter, a channel, such as optical fiber, and a receiver. Data is encoded into symbols and the symbols are encoded into optical signals for transmission. At the receiver, optical signals are detected and decoded into symbols. A transceiver may be provided at each end of the channel for two-way communication.

In a communication channel, each symbol has a time interval. When a particular symbol does not remain in its symbol time interval, but instead spreads out into a symbol time interval reserved for a previous or subsequent symbol, the adjacent symbol suffers from a type of distortion known as intersymbol interference (ISI). In an optical channel, a pulse can spread out of its interval due to insufficient channel bandwidth, because of chromatic dispersion of the pulse, or both. At the receiver, each interval is examined and a decision is made as to which symbol the optical signal in the symbol time interval represents. The presence of ISI can cause the receiver to make mistakes.

To combat ISI, a receiver may employ a decision feedback equalizer (DFE). While a DFE can be effective at eliminating ISI, it can significantly increase the complexity of the receiver. In addition, receivers that use DFE may not easily scale to higher throughputs.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
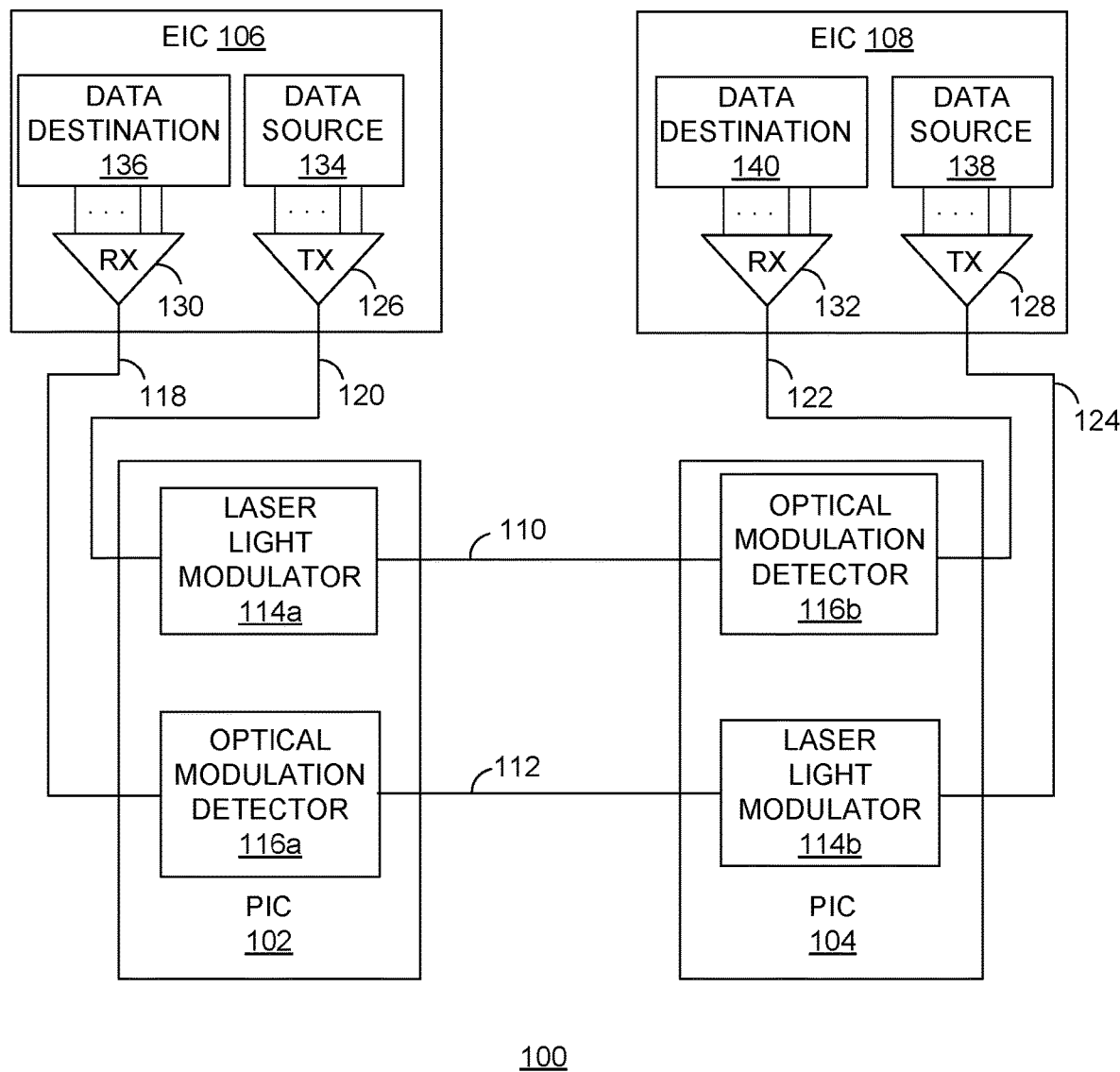
FIG. 1 is a high-level block diagram of a system for data transfer over an optical link in accordance with various embodiments.

Various embodiments are directed to a receiver-transmitter architecture for silicon photonic links. While embodiments may be used in a variety of systems, they may be particularly suited for optical links that do not have crosstalk as their limiting factor.

In some embodiments, a transmitter comprises precoders to encode symbols prior to transmission. Each precoder includes a summing unit, a modulo determining unit, and precoder function calculation circuitry. In operation, a precoder receives a symbol. The symbol belongs to an original modulation alphabet. The output of the precoder is fed back and summed with a currently received symbol. Because this sum is in an alphabet with more symbols than the original modulation alphabet, a modulo operation is performed on the sum to fold the output back into the original modulation alphabet. The feedback path includes the precoder circuitry which runs the output through precoder function calculation circuitry before it is summed with the current symbol. As a result of the precoding, a dependency between a current symbol and previous symbols is created. This dependency allows the bandwidth needed by a TIA in the receiver to be reduced by a significant amount.

A receiver, according to various embodiments, includes: (a) slicers to make decisions as to which symbol a received signal represents; and (b) functionality to decode symbols that were precoded prior to transmission. In some embodiments, the receiver decodes symbols in the digital domain after a decision has been made by a slicer. In some embodiments, the receiver decodes symbols in the analog domain before a decision has been made by a slicer.

Embodiments that perform decoding in the analog domain, prior to decision making by a slicer, employ a feedforward equalizer. The feedforward equalizer generates an equalized signal based on a sample analog signal. The feedforward equalizer comprises a plurality of memory elements to store sample analog signals, each memory element having a tap. The equalized signal comprises first and second sample values corresponding with a cursor tap and a first postcursor tap, and sample values corresponding with taps other than the cursor tap and the first postcursor tap. The sample values corresponding with taps other than the cursor tap and the first postcursor tap are attenuated relative to the first and second sample values. The first and second sample values may have amplitudes that are substantially equal and which correspond with two or more first symbols of a first alphabet.

After the receiver decodes symbols, in either the digital or analog domain, a modulo operation is performed on the two or more first symbols and one or more second symbols are generated. The second symbols belong to a second alphabet, which is the same alphabet as the original modulation alphabet.

There are many technical effects of the various embodiments disclosed herein. For example, embodiments provide an architecture for transmitting and receiving data that can operate at lower power than known solutions, while having a low bit error rate (BER). Various embodiments of a receiver can decode precoded symbols while reducing ISI. Other technical effects will be evident from the various figures and embodiments.

There are many advantages of the various embodiments disclosed herein. Known receivers can use a decision feedback equalizer (DFE) to cancel ISI. In various embodiments, a DFE in the receiver is not required to cancel ISI. Eliminating a DFE in the receiver can reduces the complexity and power requirements of the receiver. In addition, DFE-based analog receivers do not scale to higher throughputs well because of a critical timing loop in the DFE. In contrast, various embodiments can be scaled to higher data rates with less complexity, power, and area as compared with DFE-based analog receivers. The disclosed embodiments recover some of the benefits of DFE-based receivers as due to the encoding/decoding—the receiver front end may be designed with lower bandwidth and thus—have lower noise which improves detection quality, SNR, and BER. Another advantage of the disclosed embodiments is that a die-to-die interface is not required.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As used in this description and the claims, the terms "circuit" and "circuitry" comprise various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processors. In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuits and circuitry can include two or more instances of circuitry. Circuits and circuitry may comprise a combination of hardware elements that cooperate to provide one or more functions. A particular instance of a circuits and circuitry may be referred to with a descriptive or non-descriptive label. For example, instances of circuits and circuitry that perform various functions may be referred to as receiver circuitry, processor circuitry, first circuit, or second circuit. Each of two or more instances of a circuit and circuitry can be comprised of distinct components. In addition, two or more instances of a circuit or circuitry can share one or more common components or resources.

The technologies described herein may be implemented in one or more electronic and electro-optical devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), network switches and routers, cellular network base-station equipment, set-top boxes, smart phones, tablet personal computers, ultra-mobile personal computers, wired telephones, combinations thereof, and the like. More generally, the technologies described herein may be employed in any of a variety of electronic devices that transmit or receive data over an electro-optical link. As one example, a data center can have many racks containing multiple servers in close proximity Servers in the data center may communicate with one another over an optical channel using embodiments of the transmitters and receivers disclosed herein.

FIG. 1 is a high-level block diagram of a system 100 for data transfer over an optical link in accordance with various embodiments. The system 100 includes photonic integrated circuits (PICs) 102 and 104, and electrical integrated circuits (EICs) 106 and 108. Optical link 110 connects a laser light modulator 114a in PIC 102 to an optical modulation detector 116b in PIC 104. In parallel fashion, optical link 112 connects a laser light modulator 114b in PIC 104 to an optical modulation detector 116a in PIC 102. The optical links or channels 110 and 112 can be optical fiber. In various embodiments, optical links 110, 112 are low BER, low latency optical links for intra-data center use. For example, the disclosed optical channels can be on the order of a few cm, on the order of 10 m, on the order of 100 m, or on the order of 1000 m. However, the length of optical channels described in this description is not limited to the foregoing ranges. While in some embodiments, the length of optical links 110, 112 could be 1 km or more, it is not contemplated the length would be substantially greater than 10 km.

PIC 102 is connected to electrical integrated circuit (EIC) 106 via electrical interconnections 118 and 120. PIC 104 is connected to EIC 108 via electrical interconnections 122 and 124. EIC 106 includes a transmitter (TX) 126 and a receiver (RX) 130. Transmitter 126 is connected to a data source 134 and receiver (RX) 130 is connected to data destination 136. Similarly, EIC 108 includes a transmitter (TX) 128 and a receiver (RX) 132. Transmitter 128 is connected to a data source 138 and receiver (RX) 132 is connected to data destination 140. Data sources 134, 138 and data destinations 140, 136 can be any logic, circuitry, or modules that generate, process, or consume data.

In the system 100, photonic components are located on PICs 102, 104, and electrical components are located on EICs 106, 108. Typically, devices on PICs have larger dimensions (e.g., 32 nm or 45 nm) than devices on EICs (less than 10 nm). Placing photonic components on one die and electrical components on another die allows power and area of each die to be separately optimized. However, various embodiments disclosed in this description are not limited to implementations where photonic and electrical components are placed on separate dies. For example, in some embodiments, a TIA is placed on a PIC together with a photo detector. It is not unforeseeable that in the future the PIC will be efficient enough in terms of density, power and cost that the entire electrical transceiver may be implemented within it, and the EIC and PIC may be merged.

In this description, the term "die" generally refers to a single continuous piece of semiconductor material (e.g. silicon) where transistors or other components making up a processor core or other functional block reside. In this description, the term "package" generally refers to an integrated circuit (IC) package containing two or more dies. The dies can be coupled together through an interposer, an interconnection bridge, or a package substrate, hybrid bonding, or through any other suitable manner Each IC die can be of a different size, material, manufacturing process or have a different function than other dies in the package. The various dies in a package can form a system on chip (SoC) or system in package (SiP).

The system 100 is shown in FIG. 1 as a block diagram. The dies in system 100 can be arranged in a package in a variety of ways, each with a different way of coupling the dies. In some embodiments, an EIC and a PIC can be constructed in a stacked die arrangement, e.g., EIC 106 can be stacked on top of PIC 102, where electrical interconnections 118, 120 are electrical pads in direct contact with one another. In some embodiments, an EIC and a PIC are arranged on opposite sides of a substrate and positioned such that they can be interconnected with a vertical connection through the substrate. For example, EIC 106 can be placed on one side of a substrate and at least partially opposite PIC 102 on the opposite side of the substrate, where electrical interconnections 118, 120 are through-substrate VIAs. In still other embodiments, an EIC and a PIC are arranged on the same side of a substrate and interconnected with a horizontal connection through the substrate, e.g., EIC 106 can both be placed side-by-side with PIC 102 on one side of a substrate, where electrical interconnections 118, 120 include horizontal metal conductors in the plane of the substrate.

In this description, the term "die-to-die interface" generally refers to a functional block that provides a data interface between two dies that are assembled in the same package, such as a SoC or SiP. Various embodiments support die-to-die interfaces and interfaces with on-die busses. However— we do not refer to the EIC-to-PIC connections 118 and 120 in the same manner as "die-to-die interface", since they involve much higher per-wire rates and more involved signaling schemes.

Figure 2:
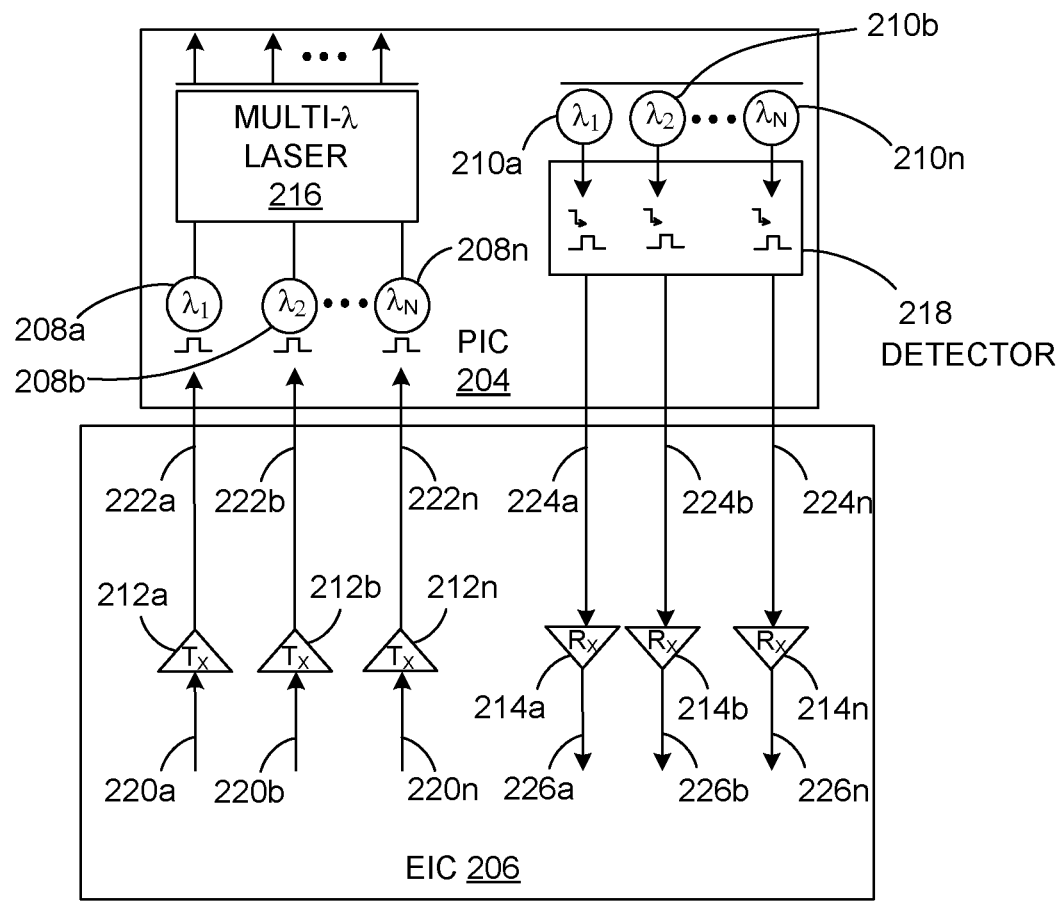
FIG. 2 illustrates a high-level view of a system for wavelength-multiplexed data transfer over an optical link in accordance with various embodiments.

FIG. 2 illustrates a high-level view of a system 200 for wavelength-multiplexed data transfer over an optical link in accordance with various embodiments. System 200 comprises PIC 204 and EIC 206. PIC 204 includes a plurality of modulators 208a, 208b, . . . 208n at different wavelengths, and a plurality of demodulators 210a, 210b, . . . 210n at a plurality of different wavelengths. Modulators 208 are connected to multi-wave length laser 216, and to transmitter (TX) blocks 212a, 212b, . . . 212n on EIC 206. Demodulators 210 are connected to detector 218, which is connected to receiver (RX) blocks 214a, 214b, . . . 214n on EIC 206.

Transmitters 212 each receive one of N parallel digital data streams 220a, 220b, . . . 220n from a data source, each representing a channel Transmitter 212 constructs N serial data streams 222a, 222b, . . . 222n to drive optical modulators 208a, 208b, . . . 208n. In various embodiments, transmitters 212 receive N parallel digital data streams from a die to die interface or from an on-die data source. Each serial data stream 222 drives a single modulator 208 that modulates a single wavelength on an optical fiber (not shown). Multi-wave length laser 216 transmits data at multiple different wavelengths, wherein each serial data stream 222 is a multiplexed at a distinct wavelength.

Detector 218 includes a plurality of photo diodes or other photo detectors. Each photo detector is tuned to detect optical signals at one of a plurality of wavelengths. Each photo detector outputs a data stream 224a, 224b, . . . 224n corresponding with detected optical signals. The data stream of each photo detector is coupled with one of the receivers 214a, 214b, . . . 214n. Each receiver 214 converts a data stream 224 into a parallel data stream 226. Parallel data streams 226a, 226b, . . . 226n can be provided to a die-to-die interface or a data destination on EIC 206.

Figure 3:
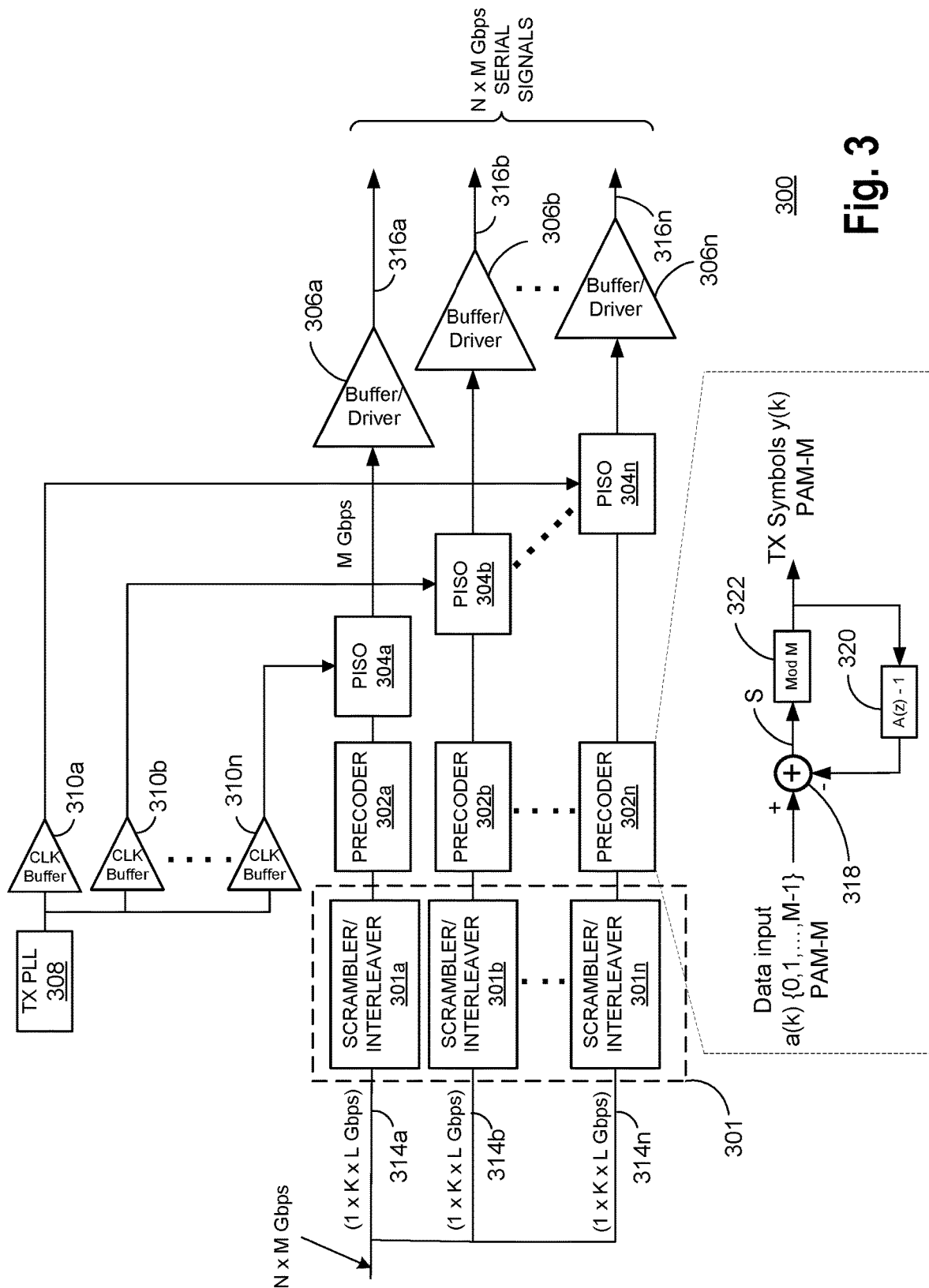
FIG. 3 illustrates a transmitter for multi-channel, wavelength-multiplexed data transfer over an optical link in accordance with various embodiments.

FIG. 3 illustrates a transmitter 300 for multi-channel, wavelength-multiplexed data transfer over an optical link in accordance with various embodiments. Transmitter 300 includes a plurality of precoders 302a, 302b, . . . 302n, a plurality of parallel-to-serial converters (PISO) 304a, 304b, . . . 304n, and a plurality of buffer/drivers 306a, 306b, . . . , 306n. In some embodiments, transmitter may optionally include a plurality of scrambler/interleavers 301a, 301b, . . . 301n to scramble the bitstream to improve its statistical characteristics. Any suitable scrambling technique can be used. As two non-limiting examples, an IEEE 802.3 66/64 scrambler or linear feedback shift register (LFSR) self-synchronizing scrambler could be used. In addition, scrambler/interleavers 301 can cause separate data channels to be alternated or interleaved before entering precoder 302. If the incoming data is scrambled, use of a scrambler may be omitted. However, if the incoming data is not scrambled, use of scrambler may be necessary. A phase lock loop circuitry (TX PLL) 308 generates a transmit clock signal. Each clock buffer 310a, 310b, . . . 310n receives the transmit clock signal from phase lock loop circuitry 308 and outputs a clock signal to one of the parallel-to serial converters 304. Each of parallel-to-serial converters 304 generates a serial bit stream for transmission. The output of each of parallel-to-serial converter 304 is connected to a respective one of the buffer/drivers 306a, 306b, . . . 306n. Buffer/drivers 306 may be line buffers. Each buffer/driver 306 provides serial data signals to a modulator that modulates a single wavelength, and which is coupled with a multi-wave length laser. In some embodiments, buffer/drivers 306 can be eliminated and the serial bit stream from parallel-to-serial converters 304 can be provided directly to the photonic device modulator driver. Parallel-to-serial converters 304, buffer/drivers 306, phase lock loop circuitry 308, and clock buffers 310 may be of any suitable design known in the art.

In operation, transmitter 300 receives N parallel digital data streams from a data source at M Gbps (gigabits per second), each data stream representing a channel. The N data streams are split into separate data streams 314a, 314b, . . . 314n, each of which is fed to a respective precoder 302. Each data stream is K bits wide and is received at L Gbps, where M=K×L. Respective parallel-to-serial converters 304 receive precoded parallel data from the precoders 302 and output a serial bit stream. Buffer/drivers 306 output serial streams 316a, 316b, . . . 316n to a laser light modulator (not shown) for transmission.

In an embodiment, each received bit is non-return-to-zero (NRZ) encoded and each of the digital data streams 314 is 16 bits wide (K=16). Each of the digital data streams 314 is received at 4 Gbps (L=4), and precoded serial data is output from a PISO 304 at M Gbps, which in this example is 64 Gbps. Accordingly, in an embodiment, transmitter 300 receives N×16 channels of 4 Gbps as input, corresponding with N×64 Gbps optical channels transmitted in NRZ. In one embodiment, N=8, providing a transmitter capable of transmitted data at 512 Gbps. However, this is not critical and other arrangements can be used, e.g., N×100 Gbps transmitted in PAM-4, or other data rates and modulations can be used. It should be understood that the use of NRZ is for simplification of the explanation and the data rates chosen are arbitrary.

In various embodiments, each of precoders 302 comprises a summing unit 318, precoder function calculation circuitry 320, and a modulo unit (Mod M) 322. In this description and in the claims, modulo unit 322 may also be referred to as remainder determining circuitry. As can be seen in FIG. 3, a current symbol is summed with the previous symbol after it goes through a modulo operation implemented by modulo unit 322 and a polynomial operation implemented by precoder function calculation circuitry 320. Each precoder instance receives pulse-amplitude modulation-M (PAM-M)

encoded data, where M may equal 2 (NRZ), 4, or other positive integer value of M. Each of precoders 302 receives symbols, performs calculations, and outputs precoded symbols one symbol at a time, i.e., symbols are processed in a serial-like order.

Summing unit 318 receives a symbol a(k) of an original modulation alphabet {0, 1, . . . , M−1} and a feedback symbol derived from the previous symbol y(k). The output "S" of summing unit 318 will not be a member of the original modulation alphabet. For this reason, precoders 302 include modulo unit 322 to fold the sum back into the original modulation alphabet. For example, if the bits to be transmitted are encoded NRZ (PAM-2), the modulation alphabet contains two symbols: {0, 1}, but the sum of two NRZ encoded bits is trinary, not binary. For this NRZ example, a modulo two function (Mod 2) will cause the output of the precoder to comprise symbols only from the original two-symbol alphabet: {0, 1}. As another example, if the bits to be transmitted are encoded using the PAM-4 coding scheme, a modulo four function (Mod 4) will cause the output of the precoder to comprise symbols only from the original four-symbol alphabet: {0, 1, 2, 3}. In various embodiments, any suitable coding scheme may be used in precoders 302. In various embodiments, a modulo unit 322 suitable for the selected coding scheme may be used, e.g., Mod 2, Mod 4, etc.

Precoder function calculation circuitries 320 have a precoder function: A(z)−1. The precoder function may be selected in various ways, depending on how the channel is designed, and its intersymbol interference (ISI) and crosstalk features. (Note that the independent variable in A(z) is also equivalently written as $A(z^{-1})$ in digital signal processing literature.) One embodiment of A(z) is shown in Equation 1:

$$A(z)=1+a_1 \cdot z^{-1} \quad (1)$$

In other embodiments, more complex versions of A(z), with as many terms as desired, may be used. Equation 2 shows the general form for A(z), according to various embodiments:

$$A(z)=1+a_1 \cdot z^{-1}+a_2 \cdot z^{-2}+a_3 \cdot z^{-3}+ \ldots \quad (2)$$

Because precoders 302 sum a current and a modified version of a previous symbol, they create a dependency between the current symbol and previous symbols in time intervals immediately prior to the current time interval. This dependency between current and previous symbols allows the bandwidth needed by a TIA in the receiver to be reduced by a significant amount. An advantage of various embodiments is that the bandwidth (rate of symbol transfer) required by a TIA in the receiver is reduced without loss of information in the transmitted signal. While the signal received at the receiver may still have ISI, a further advantage of various embodiments is that symbols received with ISI can be determined without requiring a decision feedback equalizer (DFE) in the receiver to cancel ISI. Eliminating a DFE in the receiver can provide significant benefits, including reducing the complexity and power requirements of the receiver. In addition, DFE-based analog receivers do not scale to higher throughputs well because of a critical timing loop in the DFE. In contrast, another advantage of various embodiments disclosed in this description is that they can be scaled to higher data rates with less complexity, power, and area as compared with DEF-based analog receivers.

Figure 4:
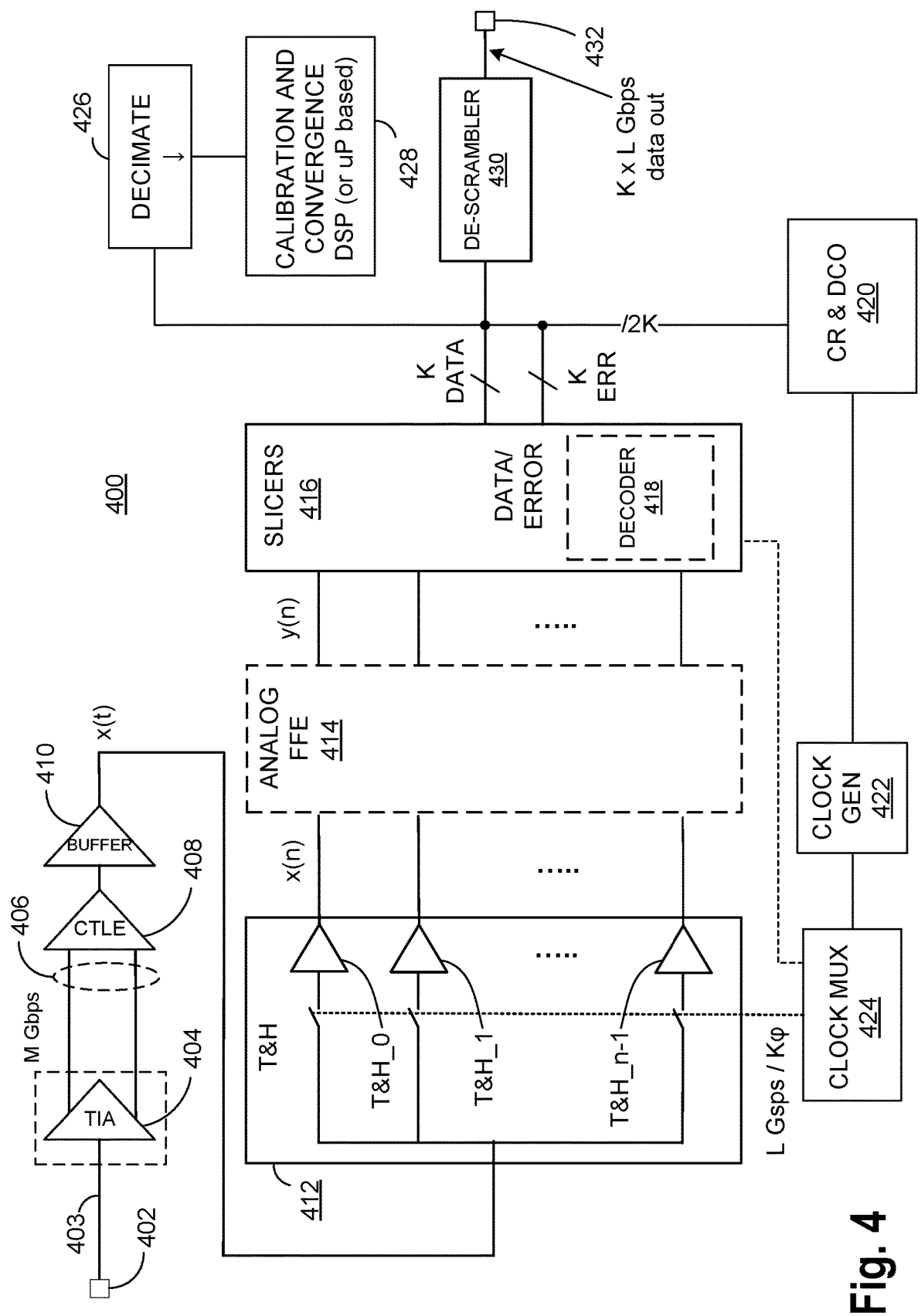
FIG. 4 illustrates a receiver for serial data transferred over an optical link in accordance with various embodiments.

FIG. 4 illustrates a receiver 400 for a single channel of serial data transferred over an optical link in accordance with various embodiments. An input 402 to receiver 400 can be derived from an optical demodulator isolating a single wavelength from an optical fiber. Photodiode detector current from the demodulator is received on conductor 403 and converted to differential voltages 406 using TIA 404. In various embodiments, the detector current and voltages output from TIA 404 correspond with NRZ symbols (or other M of PAM-M) that were precoded according to embodiments described herein, e.g., by precoder 302 in transmitter 300. In an embodiment, NRZ symbols corresponding with the voltage output are received at 64 Gbps (M=64). In other embodiments, the symbols can be received at other data rates and symbol modulations.

One of ordinary skill in the art will appreciate that TIA 404 can be a noisy circuit. In various embodiments, TIA 404 outputs differential voltages 406 to a continuous time linear equalizer (CTLE) 408. In various embodiments, CTLE 408 can remove residual ISI from the output voltages 406. In various embodiments, CTLE 408 can compensate for low-pass effects in the TIA 404.

In some embodiments, TIA 404 and CTLE 408 are on different dies. For example, TIA 404 can be placed on a PIC or as a discrete device abutted to a PIC. In some embodiments, TIA 404 and CTLE 408 are placed on the same die. For example, TIA 404 can be integrated within an EIC.

In various embodiments, the signal output from CTLE 408 is input to a buffer 410. In some embodiments, the output of CTLE 408 is input to two or more buffers 410 connected in parallel. The output x(t) of buffer 410 is provided to a track and hold (T&H) circuitry 412, also known as sample and hold circuitry. In embodiments in which multiple buffers 410 are used, each instance of buffer 410 can feed a single T&H unit, or two or more T&H units. Buffers 410 facilitate driving T&H circuitry 412. The output x(t) is the signal at time t before sampling and after CTLE equalization.

In various embodiments, T&H circuitry 412 has one or more channels. In addition to capturing samples of analog voltage signals, the multiple channels of T&H circuitry 412 serve to perform a serial-to-parallel conversion of the received signals. In various embodiments, T&H circuitry 412 has the same number of channels as the width K of parallel data streams input to precoders 302 in transmitter 300. In other embodiments, the T&H circuitry 412 can have more or fewer channels than the width of parallel data input to precoders 302 in transmitter 300, depending on the desired level of multiplexing/demultiplexing. In an example embodiment, T&H circuitry 412 has 16 channels, i.e., T&H_0, T&H_1, . . . , T&H_15, which corresponds with (K=16) input data streams 314. The output x(t) is provided to each of channel of T&H circuitry 412. The value of output x(t) is held or captured a particular channel input at a sample time in response to a clocking signal. In this description and in the claims, T&H circuitry 412 may be referred to simply as sampling circuitry.

In some embodiments, data is received at 64 Gbps, T&H circuitry 412 has 16 channels, and the clock frequency of clock multiplexer 424 is 4 Gbps, e.g., M=64, K=16, and L=4. Accordingly, an embodiment of T&H circuitry 412 with 16 channels enables receiver 400 to directly drive a die-to-die interface at a rate of 4 Gbps per lane when symbols are received over an optical link at 64 Gbps per wavelength. In various other embodiments, T&H circuitry 412 can have a higher or lower number of channels for other data rates or symbol modulations. The outputs of T&H circuitry 412 may be referred to as a "sample signal" or "sample analog signal," and are denoted x(n), where "n" denotes a sequence number of a sample analog signal. In the example of FIG. 4, T&H circuitry 412 outputs n parallel samples of the incoming analog signal, i.e. x(0), x(1), x(2), . . . x(n−1).

In some embodiments, receiver 400 optionally includes analog feed forward equalizer (FFE) 414. FFE 414 can be included if additional equalization would be helpful in a particular implementation to counter ISI, or to implement various features of embodiments as described herein. If FFE 414 is included, the outputs of T&H circuitry 412 are fed to FFE 414. If FFE 414 is not included, the outputs of T&H circuitry 412 are fed directly to the slicers block 416. Accordingly, in some embodiments, the inputs of slicers block 416 can be connected to the outputs x(n) of T&H circuitry 412. In embodiments in which receiver 400 includes FFE 414, the inputs of slicers block 416 are connected to the outputs y(n) of FFE 414.

Slicers block 416 includes data slicer and error slicers. Slicers block 416 detects symbols by making decisions about received signals. The number of data slicers and error slicers in slicers block 416, and the complexity of how the slicers are configured, varies depending on the number of possible amplitudes in the received PAM encoded signal y(n). Received signals having higher constellations require more slicers and have a more complex data and error slicer configuration than signals having lower constellations. For example, if the received signal is PAM-4, the alphabet includes the symbols: {3, 1, −1, −3}, and three data slicers are required: a first a slicer (with a voltage reference=+2) to decide between 3 and 1, a second slicer (with a voltage reference=0) to decide between 1 and −1, and a third slicer (with a voltage reference=−2) to decide between −1 and −3. In contrast, if the received signal is the less complex PAM-3, the alphabet symbols are: {1, 0, −1}, and only two data slicers are required: a first a slicer (with a voltage reference=+0.5) to decide between 1 and 0, and a second slicer (with a voltage reference=−0.5) to decide between 0 and −1. It should be understood that while examples of slicers blocks in this description are for less complex PAM encoded signal with small constellations, this is done so as to not obscure the inventive principles disclosed herein. It is contemplated that more complex slicers capable of handling data encoded using any high alphabet PAM scheme can be implemented in other embodiments as required.

As mentioned, an embodiment of T&H circuitry 412 has 16 channels, each channel receiving data at a rate of 4 Gbps. In an embodiment, slicers block 416 has 16 sets of data and error slicers, one set for each channel Each set of data and error slicers having the required number of slicers for the particular type of PAM encoding used. This embodiment advantageously provides the ability to directly connect the outputs of slicers 416 to destination circuitry at a data transfer rate of 16×4 Gbps without the need for die-to-die interface circuitry. Only 4 Gbps buffers are required in lieu of die-to-die interface circuitry. In other embodiments, slicers block 416 can have more or fewer than 16 sets of data and error slicers.

Slicers block 416 outputs K data and K error (ERR) signals. In the embodiment in which slicers block 416 has 16 sets of data and error slicers, it outputs 16 data signals and 16 error signals. Each channel or data path of slicers block 416, in some embodiments, can have one or more data slicers and an error slicer, or fewer than one data and error slicer. Error slicers are required for the timing recovery subsystem and for other control loops (gain, FFE coefficients control, and CTLE tuning). In embodiments, the number of error slicers can be reduced in order to save power by either multiplexing them between different inputs or simply reducing their count and sacrificing some visibility/tracking capability. In some embodiments, slicer 416 includes digital decoder 418, which is further described below.

In various embodiments, the data and error decisions output from slicer 416 are fed into clock recovery (CR) & digitally controlled oscillator (DCO) circuitry 420. CR & DCO 420 circuitry comprises a timing detector (not shown), and a proportional-integral (PI) controller or other suitable controller (not shown), and DCO or voltage-controlled oscillator (VCO). CR & DCO 420 circuitry may employ any suitable architecture and components known in the art. The timing detector may include both a frequency detector and a phase detector. In addition, any suitable timing detector known in the art may be used. In some embodiments, a Mueller & Muller type detector can be used. The DCO or VCO generates a sample clock for T&H circuitry 412 to trigger the T&H circuitry. The DCO or VCO also generates a sample clock for slicers block 416. CR & DCO 420 circuitry may be referred to in this description and in the claims simply as clock and data recovery (CDR) circuitry. In some embodiments of the invention, a dedicated, unique timing detector may be used as described later which assists in decoding the pre-coded signal.

Receiver 400 includes clock generator (CLOCK GEN) 422, which is controlled by the CDR circuitry to construct strobe signals to trigger the T&H circuitry 412 at sample times. These strobe pulses or clocking signals are provided in a circular order to respective channels of T&H circuitry 412 via clock multiplexer (CLOCK MUX) 424. These strobe pulses or clocking signals dictate sample times for the channels in the T&H circuitry 412 and can be tuned to compensate for systematic timing errors in T&H 412 construction. In embodiments, one strobe pulse is provided per symbol period. In some embodiments, a strobe pulse may be provided at a center of a symbol period, while in other embodiments, a strobe pulse is offset from the center of the symbol period. In some embodiments, strobe pulses are provided to 16 channels, e.g., T&H_0, T&H_1, . . . , T&H_15. In some embodiments, clock generator 422 can be comprised of a delay lock loop (DLL) or a group of phase interpolators.

The data and error decisions output from slicer 416 are also fed into decimate block 426, which feeds calibration and convergence block 428. The calibration and convergence block 428 may be implemented with a digital signal processor (DSP) or microcontroller (µP). In some embodiments, receiver 400 includes optional de-scrambler 430. For example, if the data that receiver 400 receives is scrambled, either because transmitter 300 included scrambler 301 or because incoming data to transmitter 300 arrived in scrambled condition, de-scrambler 430 could be included to de-scramble scrambled data. If the data receiver 400 receives is not scrambled, de-scrambler 430 may be omitted. Receiver 400 outputs n channels, each K bit wide, of parallel data at output 432 at a rate of L Gbps. In an embodiment, receiver 400 outputs n 16-bit wide channels at a rate of 4 Gbps.

Figure 5:
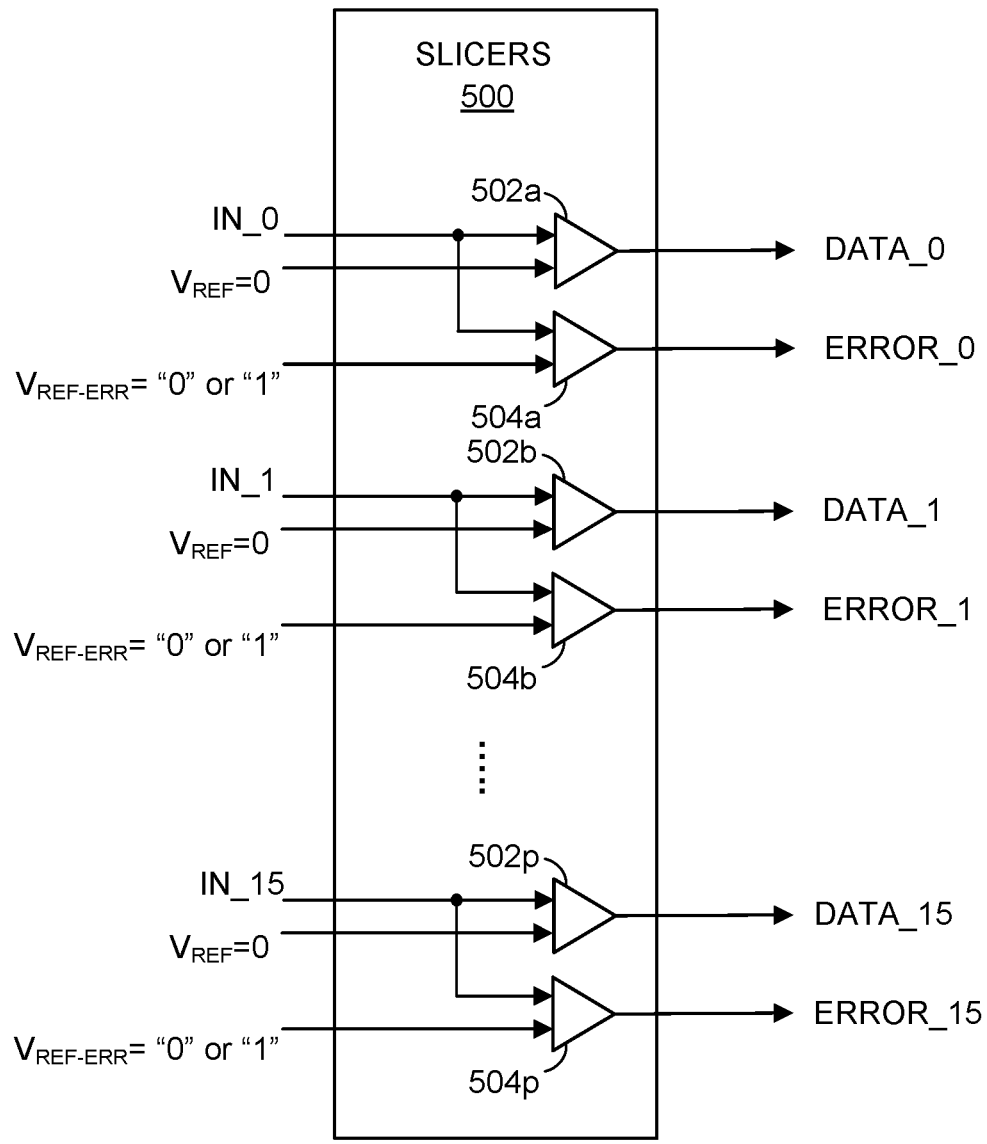
FIG. 5 illustrates a slicer for NRZ data not precoded prior to transmission according to various embodiments.

FIG. 5 illustrates a slicers block 500 for NRZ data not precoded prior to transmission according to various embodiments. Slicers block 500 may be used in embodiments in which precoders 302 in transmitter 300 are not used to precode data. The example slicer 500 in FIG. 5 is configured for 16 inputs of NRZ input. Slicers block 500 includes a data slicer 502 and an error slicer 504 for each input (IN_0, IN_1, . . . , IN_15). Each of data slicers 502a, 502b, . . . , 502p compares the input signal with a voltage reference signal ($V_{REF}$) Each of error slicers 504a, 504b, . . . , 504p compares the input signal with two voltage reference error signals ($V_{REF-ERR}$). In one embodiment, $V_{REF-ERR}$ is multiplexed between voltages corresponding with logic "1" and logic "0" values. In another embodiment, two instances of error slicer 504 are provided for each input, where one instance is coupled with $V_{REF-ERR}$="1" and the other instance is coupled with $V_{REF-ERR}$="0." Each data slicer 502 outputs a respective data signal (DATA_0, DATA_1, ..., DATA_15). Each error data slicer 504 outputs a respective data signal (ERROR_0, ERROR_1, ..., ERROR_15). Slicer 500 decides which symbols the analog signals on its inputs represent. The data signals DATA_0, DATA_1, ..., DATA_15 are digital signals that represent these decisions. While example slicers block 500 in FIG. 5 is configured for 16 inputs, in other embodiments, slicers block 500 can be configured for more or fewer inputs.

As mentioned, slicers block 500 is for an NRZ data encoding. In other embodiments, slicers block 500 can be configured for other symbol encodings, e.g., PAM-M, where M can be any integer. For example, in some embodiments, slicers block 500 includes three slicers for PAM-4 encoded data. In a PAM-4 embodiment, reference voltages $V_{REF}$ equal ⅔*A, 0, and –⅔*A for a constellation of amplitude A, and voltage reference error signals $V_{REF-ERR}$ of A, ⅓*A, –⅓A, and –A.

Figure 6:
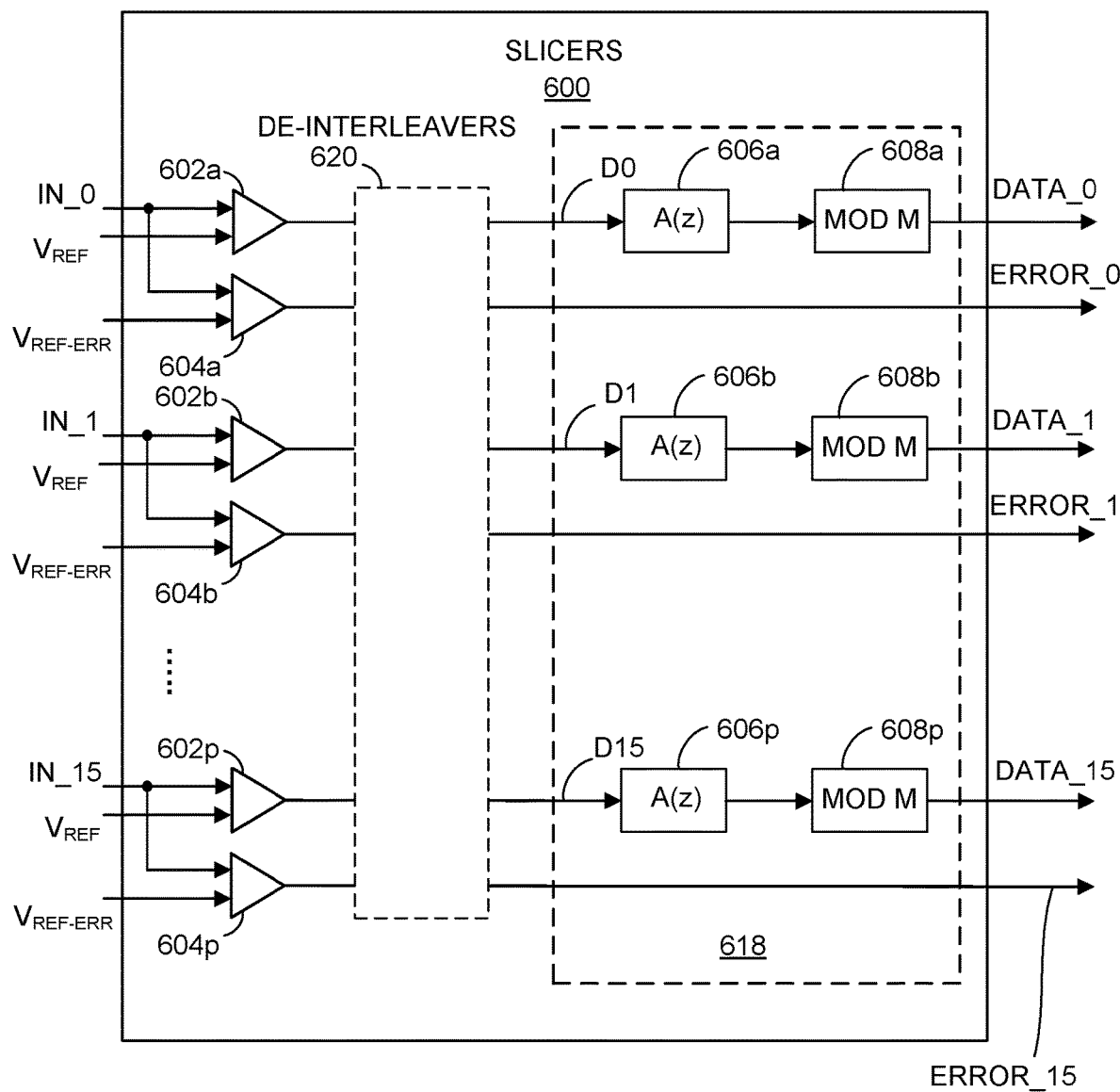
FIG. 6 illustrates a slicer for NRZ data precoded prior to transmission according to various embodiments.

FIG. 6 illustrates a slicers block 600 for NRZ data precoded prior to transmission according to various embodiments. Slicers block 600 may be used in embodiments in which precoders 302 in transmitter 300 are used to precode data prior to transmission. Because the transmitted data is precoded, decoding is required. In various embodiments, slicers block 600 includes decoder 618 for directly and digitally decoding the outputs of the data slicer. Decoder 618 comprises decoder circuitries 606a, 606b, ..., 606p, and modulo circuitries 608a, 608b, ..., 608p.

The data slicing function of slicers block 600 may be implemented in the same way or a similar way to that described above for slicers block 500. In an embodiment, slicers block 600 includes sixteen inputs input (IN_0, IN_1, ..., IN_15), data slicers 602a, 602b, ..., 602p, and error slicers 604a, 604b, ..., 604p for each respective input. Each of data slicers 602 compares the input signal with a voltage reference signal ($V_{REF}$) Each of error slicers 604 compare the input signal with two voltage reference error signals ($V_{REF-ERR}$) as described above for slicer 500. The output of data slicers 602a, 602b, ..., 602p are respective NRZ digital signals D0, D1, ..., D15.

The output of each data slicer 602 is fed through a respective one of decoder circuitries 606a, 606b, ..., 606p. The outputs of data slicers 602 may either be fed directly to decoder 618, or the output may be fed to optional de-interleavers block 620 and then the output of block 620 fed to decoder block 618. If data is interleaved before entering precoder 302 in transmitter 300, e.g., by scrambler/interleaver 301, then it may be desirable to include optional de-interleavers block 620 to make sure bits reach each A(z) function in the correct order. On the other hand, if data is not interleaved before entering precoder 302 in transmitter 300, optional de-interleavers block 620 may be omitted. Each decoder circuitry 606 has a decoder function: A(z). The decoder function is selected as the inverse of the precoder function used in the transmitter. Since decoder function A(Z) is a digital filter, its output will be a linear combination of its input, and thus will convert the NRZ input range {0,1} to a higher range, depending on the complexity of the filter. Because decisions D0, D1, ..., D15 output from data slicers 602 are from the alphabet M, a Modulo operation is necessary to return the outputs of respective decoder circuitries 606a, 606b, ..., 606p back into this alphabet. Each output of decoder circuitries 606a, 606b, ..., 606p is fed to a respective modulo circuitry 608a, 608b, ..., 608p to fold the sum back into the decoder circuitry 606 alphabet, which is also the original modulation alphabet in which data was received by transmitter 300. For example, in the case where $A(z)=1+Z^{-1}$, the output alphabet will be {0,1,2}, so to get decisions in the NRZ alphabet, a Modulo 2 operation is performed on the output the decoder circuitry. The outputs of modulo circuitry 608a, 608b, ..., 608p are the data outputs DATA_0, DATA_1, ..., DATA_15 of slicer 600.

While the example slicers block 600 illustrated in FIG. 6 is configured for 16 inputs, in other embodiments, the slicer can be configured for more or fewer inputs. In addition, as mentioned, slicers block 600 is for an NRZ data encoding. In other embodiments, slicers block 600 can be configured for other symbol encodings, e.g., PAM-M, where M can be any integer. In embodiments of slicers block 600 for encodings higher than PAM-2, decoder 618 includes additional slicers.

FIG. 6 illustrates an embodiment in which the decoding is performed on digital symbols after hard decisions are performed by a slicer. In other embodiments, decoding is performed on analog symbols prior to hard decisions performed by a slicer. An advantage of performing decoding before hard decisions by the slicer is that some decision errors in the slicer can be prevented. For example, for NRZ, if the decoder function A(z)=1+Z–1 is computed prior to decision making, it effectively averages the noise of two symbols and combines the amplitudes of them, which has an effect of roughly the square root of two ($\sqrt{2}$) on the signal-to-noise ratio (SNR), thereby making subsequent decisions by the slicer better.

Figure 7:
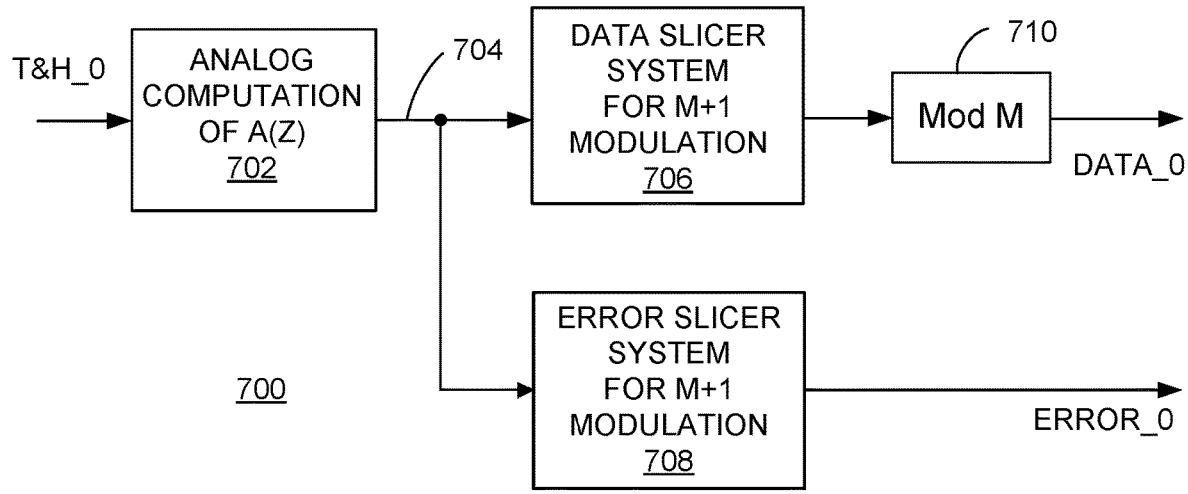
FIG. 7 illustrates circuitry for decoding analog symbols prior to slicing according to various embodiments.

FIG. 7 illustrates circuitry 700 for decoding analog symbols prior to slicing according to various embodiments. Circuitry 700 may be used be used in embodiments in which precoders 302 in transmitter 300 are used to precode data prior to transmission. The example of FIG. 7 shows one channel for decoding analog symbols prior to slicing. It should be appreciated that while the example of FIG. 7 shows a single channel for decoding analog symbols prior to slicing, in other embodiments, multiple channels are provided. In various embodiments, receiver 400 includes circuitry that includes 16 channels, each channel comprising instances of analog computation of A(Z) block 702, data slicer system 706, error slicer 708, and modulo unit 710.

For the single channel shown in FIG. 7, A(Z) computation block 702 (labeled "analog computation of A(Z)" in the figure) receives the output of T&H_0 channel of T&H circuitry 412. A data slicer system 706 receives an output 704 of A(Z) computation block 702 for slicing. Compared with the slicers 500 and 600 described above, the data slicer system 706 requires more slicers because the output 704 of A(Z) computation block 702 is PAM-(M+1) for transmitted PAM-M encoded symbols. For example, the output 704 of A(Z) computation block 702 is PAM-3 for symbols that were encoded PAM-2 (NRZ) for transmission. Accordingly, two slicers, rather than the one slicer used for decoding in the digital domain, are required to decode NRZ encoded data. In various embodiments, data slicer system 706 includes two or more slicers, depending on the scheme used to encode the data for transmission. The output of A(Z) computation block 702 is input to a modulo unit 710. Modulo unit 710 folds PAM-(M+1) output back into the PAM-M alphabet. For example, modulo unit 710 folds PAM-3 data back into the PAM-2 alphabet. The output T&H_0 of T&H circuitry 412 is also provided to an error slicer system 708 for M+1 modulation. Like data slicer system 706, error slicer system 708 can include two or more slicers, depending on the scheme used to encode the data for transmission.

As one of ordinary skill in the art will understand, feedforward equalization is a filtering technique that uses samples stored in memory elements at consecutive symbol periods, each memory element having a "tap." The taps are classified as pre-cursor, main cursor, and post-cursor taps. A particular sequence of sample signals includes a current sample signal, referred to as the main cursor. Pre-cursor taps refer to sample signals that arrive earlier in the sequence than a current sample, while post-cursor taps refer to sample signals that arrive later in the sequence than the current sample. Taps correspond with sample signals x(n), where "n" denotes position in the sequence of sample signals. For example, sample signal x(n−1) corresponds with a first pre-cursor tap $a_{-1}$. Feedforward equalization can be implemented in many ways. Various implementations may use more or fewer taps, either earlier or later than the main cursor in the sequence. Samples at each of the taps are multiplied by a weighting coefficient. For example, the coefficients for a 3-tap FFE are respectively denoted: $a_{-1}$, $a_0$, $a_1$ and respectively correspond with the postcursor, main cursor, and precursor taps. The output of an FFE is a weighted sum of the sequential samples that can be used to determine a value for the main cursor.

In various embodiments, a first method uses an FFE to implement A(Z) computation block 702 in the analog domain. In other embodiments, a second method uses an FFE in conjunction with clock and data recovery circuitry, e.g., CR & DCO 420, to implement A(Z) computation block 702 in the analog domain. In both the first and second methods, symbols that were precoded in a transmitter are decoded.

Figure 8:
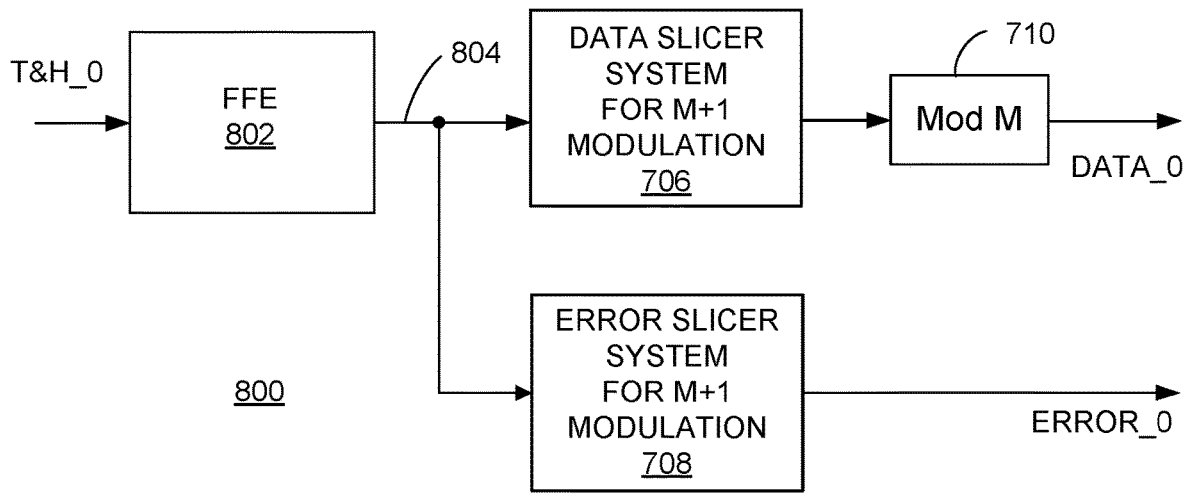
FIG. 8 illustrates circuitry for decoding analog symbols prior to slicing according to various embodiments.

FIG. 8 illustrates circuitry 800 for decoding analog symbols prior to final decisions by slicing circuitry according to various embodiments of the first method. Circuitry 800 is a version of circuitry 700 in which feedforward equalization alone is employed to implement A(Z) computation block 702 of circuitry 700. In various embodiments of the first method, circuitry 800 includes an FFE 802 for computation of A(Z) in the analog domain, data slicer system 706, modulo unit 710, and error slicer system 708. While the example of FIG. 8 shows a single channel, it should be appreciated that multiple channels are provided in other embodiments that use the first method. In various embodiments, receiver 400 includes circuitry that includes 16 channels, each channel comprising instances of FFE 802 for computation of A(Z) in the analog domain, data slicer system 706, error slicer 708, and modulo unit 710.

In various embodiments, FFE 802 is a feedforward equalizer in which weighting coefficient for cursor $a_0$=1. The impulse response $h_{FFE}(n)$ for FFE 802 is given by equation (1), where δ is the Dirac Delta (impulse) function.

$$h_{FFE}(n)=\delta(n)+\delta(n-1)+\text{(other taps)} \quad (1)$$

While equation (1) indicates $h_{FFE}(n)$ is equal to a function, it should be understood that because of implementation issues, $h_{FFE}(n)$ may be approximately, rather than exactly, equal to the function. In embodiments, FFE 802 can have two or more taps. FFE 802 may comprise any suitable number of taps for a particular implementation. However, in various embodiments, FFE 802 has ten or fewer than ten taps. Generally, FFE 802 does not require more than ten taps as the optical channel, e.g., optical links 110, 112 between transmitter 300 and receiver 400 is of a length such that the channel is not expected to have large ISI components that may be present in some channels, such as long-reach Ethernet electrical channels. Equation (2) shows an expression for the output y(n) of the FFE 802 filter using convolution, where x(n) is the input.

$$y(n)=x(n)*h_{FFE}(n) \quad (2)$$

Equations (3), (4), and (5) show the output y(n) of FFE 414 for sample signals n=0, 1, 2.

$$y(0)=x(0)+x(-1)+O(0) \quad (3)$$

$$y(1)=x(1)+x(0)+O(1) \quad (4)$$

$$y(2)=x(2)+x(1)+O(2) \quad (5)$$

The first two components on the right side of expressions (3), (4), and (5), i.e., x(n)+x(n−1), are the result of applying A(z) on x(n) by FFE 802. The 3rd component (in "Big O" notation) or components are for additional terms, which will vary depending on the number of taps used in the implementation, each additional term representing additional residual ISI. In various embodiments, additional taps can be added using known techniques to cancel or reduce O(n), e.g. ISI. While equation (2) indicates y(n) is equal to a function, it should be understood that because of implementation issues, y(n) may be approximately, rather than exactly, equal to the function.

Figure 9A:
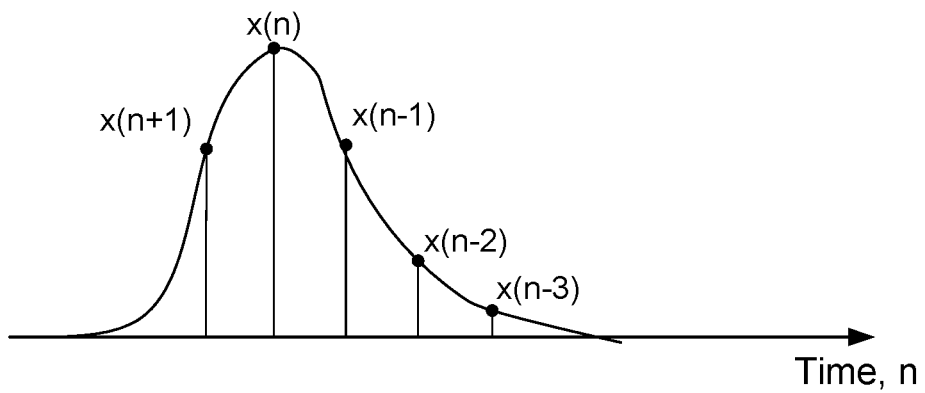
FIG. 9*a* shows an example of an impulse response before equalization according to various embodiments.
Figure 9B:
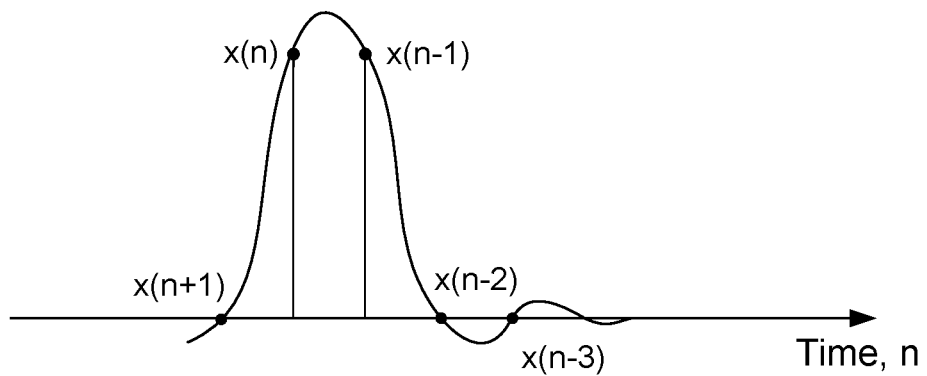
FIG. 9*b* shows the impulse response of the example signal of FIG. 9*a* after equalization according to various embodiments.

FIG. 9a shows the impulse response of the output x(n) of T&H 412 before equalization by an analog feedforward equalizer, e.g., FFE 414 or FFE 802. In various embodiments, FIG. 9b shows the impulse response of the sampled signal after equalization by an analog feedforward equalizer according to various embodiments, e.g., by FFE 802 or other FFE applying A(z) on x(n) in the time domain. In various embodiments, the impulse response shown in FIG. 9b cancels the modulation performed by the precoder 302 at transmitter 300. The output 804 of FFE 802 is in contrast to conventional feedforward equalization techniques, which are designed to sample at the peak of the impulse response waveform, and which attenuate amplitudes for all precursor and postcursor responses as much as possible, e.g., amplitudes near zero. Output 804 of FFE 802 comprises signals for cursor x(n) and precursor x(n−1), with other terms corresponding with ISI having amplitudes (as much as possible) near zero. The example impulse response of FIG. 9b includes a first sample value x(n) corresponding with a cursor tap as having a first amplitude. The example impulse response includes a second sample value x(n−1) corresponding with a first postcursor tap. It can be seen that the first amplitude is substantially equal to the second amplitude. In addition, the example impulse response includes sample values corresponding with taps other than the cursor tap and the first postcursor tap: x(n−2), x(n−3), and x(n+1). Each of these other taps have a corresponding amplitude that is attenuated relative to the first and second sample values. In various embodiments, the respective amplitudes of these other taps are substantially equal to zero. In various embodiments, the respective amplitudes of these other taps are ten percent or less of the first amplitude. In various embodiments, the respective amplitudes of these other taps are ten percent or less of the second amplitude.

Referring again to FIG. 8, because output 804 comprises two signal samples x(n) and x(n−1), it is in a higher alphabet, e.g., PAM-3, than the one in which the symbols were originally encoded in, e.g., PAM-2. As mentioned, modulo unit 710 is used to fold this output in a first (higher)

alphabet back into a second (original) alphabet. While circuitry 800 has been described with an example in which output 804 is PAM-3, it should be appreciated that FFE 802 can be extended to higher order modulations in other embodiments. For example, if output 804 is PAM-4, then M=4, and data slicer system 706 is provided with a capability for making PAM-7 decisions, and modulo circuitry 710 is provided with a module 4 capability to Modulo 4 to fold the output back into the PAM-4 alphabet.

Translating the time domain expression for output y(n) =x(n)+x(n−1) to the frequency domain yields Y(Z)=A(Z) *X(Z), where "*" is multiplication. The use of precoding in transmitter 300 together with FFE 802 in receiver 400 allows receiver 400 to use less bandwidth as compared with bandwidth needs of conventional receivers. By allowing the receiver to use less bandwidth, the signal-to-noise ratio in the receiver is improved. In addition, the use of precoding in transmitter 300 together with FFE 802 in receiver 400 also allows the FFE 802 to be used as a decoder to recover the signal without ISI.

Figure 10A:
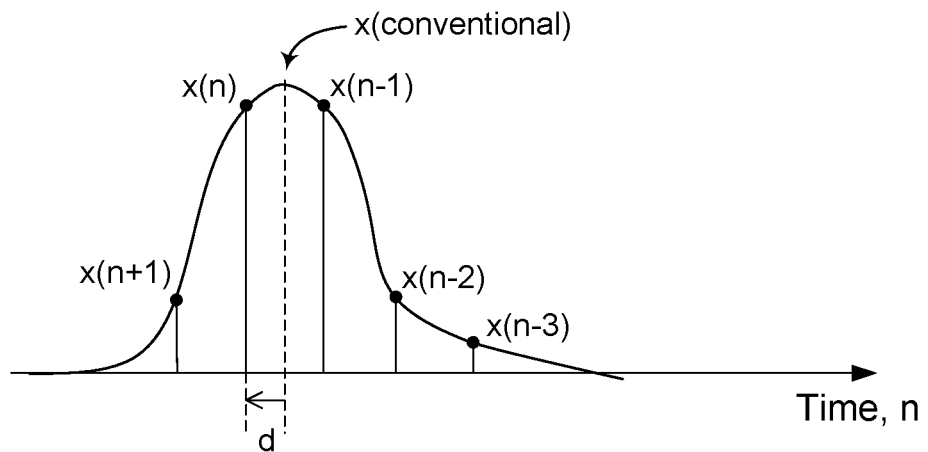
FIG. 10*a* shows an example of an impulse response before equalization with shifted sample points times according to various embodiments.
Figure 10B:
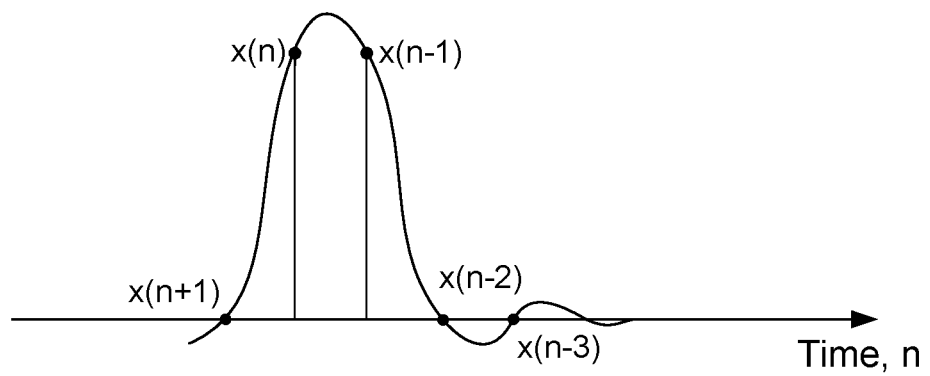
FIG. 10*b* shows the impulse response of the example signal of FIG. 10*a* after equalization according to various embodiments.

FIGS. 10a and 10b illustrate examples of impulses responses for embodiments of receiver 400 according to the second method for decoding analog symbols prior to slicing. The second method uses an FFE in conjunction with a clock and data recovery circuitry, e.g., CR & DCO 420, to implement A(Z) computation block 702 in the analog domain and to thereby decode data that was precoded in a transmitter.

Referring back to FIG. 4, receiver 400 includes CR & DCO 420 circuitry, clock generator 422, and clock multiplexer 424. Together this circuitry cooperates to construct strobe signals that are provided to the T&H circuitry 412. The strobe signals define sampling points for the channels in the T&H circuitry 412. Strobe signals are also referred to in this description and the claims as clocking signals. According to the second technique, the CR & DCO 420 circuitry is tuned or modified to shift the sampling points in the T&H circuitry 412. Conventional feedforward equalization techniques are designed to sample at the peak of the impulse response waveform by sampling at the center of symbol periods. In contrast to conventional feedforward equalization techniques, the second method shifts sample points to a point that is offset from the peak of the waveform or the center of symbol period. More specifically, sample points are shifted to a point where the amplitudes of cursor x(n) and precursor x(n−1) are substantially equal, e.g., x(n)=x(n−1). For example, x(n) may have a value that is within five or ten percent of x(n−1).

FIG. 10a shows an example impulse response of the output x(n) of T&H 412 before equalization by an analog feedforward equalizer, but with the timing of sampling points shifted by "clock and data recovery" or CDR circuitry such that x(n)=x(n−1), or x(n)≈x(n−1), according to various embodiments. For example, x(n) may have a value that is within five or ten percent of x(n−1). In FIG. 10a, the peak of the impulse response, which may be the center of symbol period, is labeled "x(conventional)." It can be seen that the sampling point for x(n) is shifted in time by an offset "d" from the conventional sample time. It should be understood that the "x(conventional)" point is not an actual sampling point and is only shown to illustrate the offset. The mechanisms used by CDR circuitry to shift sample point is described below.

In addition to using CR & DCO 420 to shift sample points, the second method uses a version of circuitry 800 show in FIG. 8. The data slicer system 706, modulo unit 710, and error slicer system 708 may be the same as previously described. As described below, in embodiments, FFE 802 for computation of A(Z) in the analog domain may be a modified version of the feedforward equalizer previously described. Like the first technique, various embodiments of the second technique, it should be appreciated that, even though FIG. 8 shows a single channel, multiple channels are provided in embodiments that implement a sample shifting technique.

In various embodiments, FIG. 10b shows the impulse response of the example signal of FIG. 10a after equalization by an analog feedforward equalizer according to various embodiments, e.g., by a version of FFE 802 or other FFE applying A(z) on x(n) in the time domain. In various embodiments, the sample point shifting of the second method uses an embodiment of FFE 802 that includes one or more taps to cancel ISI but which omits the first postcursor tap ($a_{-1}$) corresponding with x(n−1). This is done so that filtering will not interfere with the desired output of the sampling shifting technique. Output 804 of FFE 802 comprises signals for cursor x(n) and precursor x(n−1), with other terms corresponding with ISI having amplitudes (as much as possible) near zero. As can be seen in FIG. 10b, the other example terms: x(n+1), x(n−2), and x(n−3) are substantially zero. The impulse response shown in FIG. 10b cancels the modulation performed by the precoder at transmitter 300.

In various embodiments, when the sample point shifting of the second method is employed, the FFE function can be any function of the form shown in (6).

$$h_{FFE}(n)=1+1*\delta(n-1)+\text{(other taps)} \quad (6)$$

While equation (6) indicates $h_{FFE}(n)$ is equal to a function, it should be understood that because of implementation issues, $h_{FFE}(n)$ may be approximately, rather than exactly, equal to the function. The output of the FFE used in the second technique is the same as the output in the first technique, as shown in (7), (8), and (9).

$$y(0)=x(0)+x(-1)+O(0) \quad (7)$$

$$y(1)=x(1)+x(0)+O(1) \quad (8)$$

$$y(2)=x(2)+x(1)+O(2) \quad (9)$$

The first two components x(n) and x(n−1) on the right side of expressions (7), (8), and (9) are the result of applying A(z) on x(n) by FFE 802 receiving sample-shifted input. The third components are for additional terms, which will vary depending on the number of taps used in the implementation, each additional term representing additional residual ISI. In various embodiments, additional taps can be added using known techniques to cancel or reduce O(n).

FIG. 10b illustrates an impulse response of an example signal in which sample points have been shifted and after equalization by a version of FFE for sample pointed shifted signals. The output 804 of the FFE 802 version comprises signals for cursor x(n) and precursor x(n−1), with other terms corresponding with ISI having amplitudes that are as much as possible near zero. The example impulse response of FIG. 10b includes a first sample value x(n) corresponding with a cursor tap as having a first amplitude. The example impulse response includes a second sample value x(n−1) corresponding with a first postcursor tap. Similar to the impulse response shown in FIG. 9b, it can be seen that the first amplitude is substantially equal to the second amplitude, e.g., the first amplitude is within ten percent of the second amplitude. In addition, the example impulse response in FIG. 10b includes sample values corresponding with taps other than the cursor tap and the first postcursor tap: x(n−2), x(n−3), and x(n+1). Like the impulse response shown in FIG. 9b, each of these other taps have a corresponding amplitude that is attenuated relative to the first and second sample values. In various embodiments, the respective amplitudes of these other taps are small or substantially equal to zero. In various embodiments, the respective amplitudes of these other taps are less than ten percent of the first amplitude. In various embodiments, the respective amplitudes of these other taps are less than ten percent of the second amplitude. In various embodiments, the respective amplitudes of these other taps are less than five percent of the first amplitude. In various embodiments, the respective amplitudes of these other taps are less than five percent of the second amplitude.

The second method uses CDR circuitry to shift sample points. Sample points can be shifted in some embodiments by changing the S-function of a phase detector in CDR circuitry, i.e., CR & DCO 420 circuitry, to force a steady state where the cursor and postcursor amplitudes are equal, e.g., x(n)=x(n−1) or substantially or approximately equal, e.g., x(n)≈x(n−1). For example, x(n) may have a value that is within five or ten percent of x(n−1). Expression (10) is one example S-function:

$$S(n)=x(n)-x(n-1) \quad (10)$$

The cursor and first postcursor terms x(n) and x(n−1) need to be isolated from output y(n). Because a CDR loop averages the result, the contributions of the cursor and first postcursor can be determined by multiplying (10) by e(n) as shown in (11).

$$S(n)=e(n)\times[x(n)-x(n-1)] \quad (11)$$

Averaging the output over time gives the orthogonal projection of y(n) on e(n) minus the orthogonal projection of y(n−1) on e(n), which isolates the cursor and postcursor values from output y(n). In operation, CDR circuitry will drive the average value of S(n) to zero, thus settling on the desired sample point where x(n)=x(n−1), or x(n)≈x(n−1).

In other embodiments, the sample point can be shifted using a Mueller-Muller type timing recovery scheme having a phase detector with a tunable phase shift. In these embodiments, the phase shift can be tuned until the cursor and postcursor amplitudes are substantially or approximately equal, e.g., x(n)=x(n−1). For example, x(n) may have a value that is within five or ten percent of x(n−1).

Figure 11:
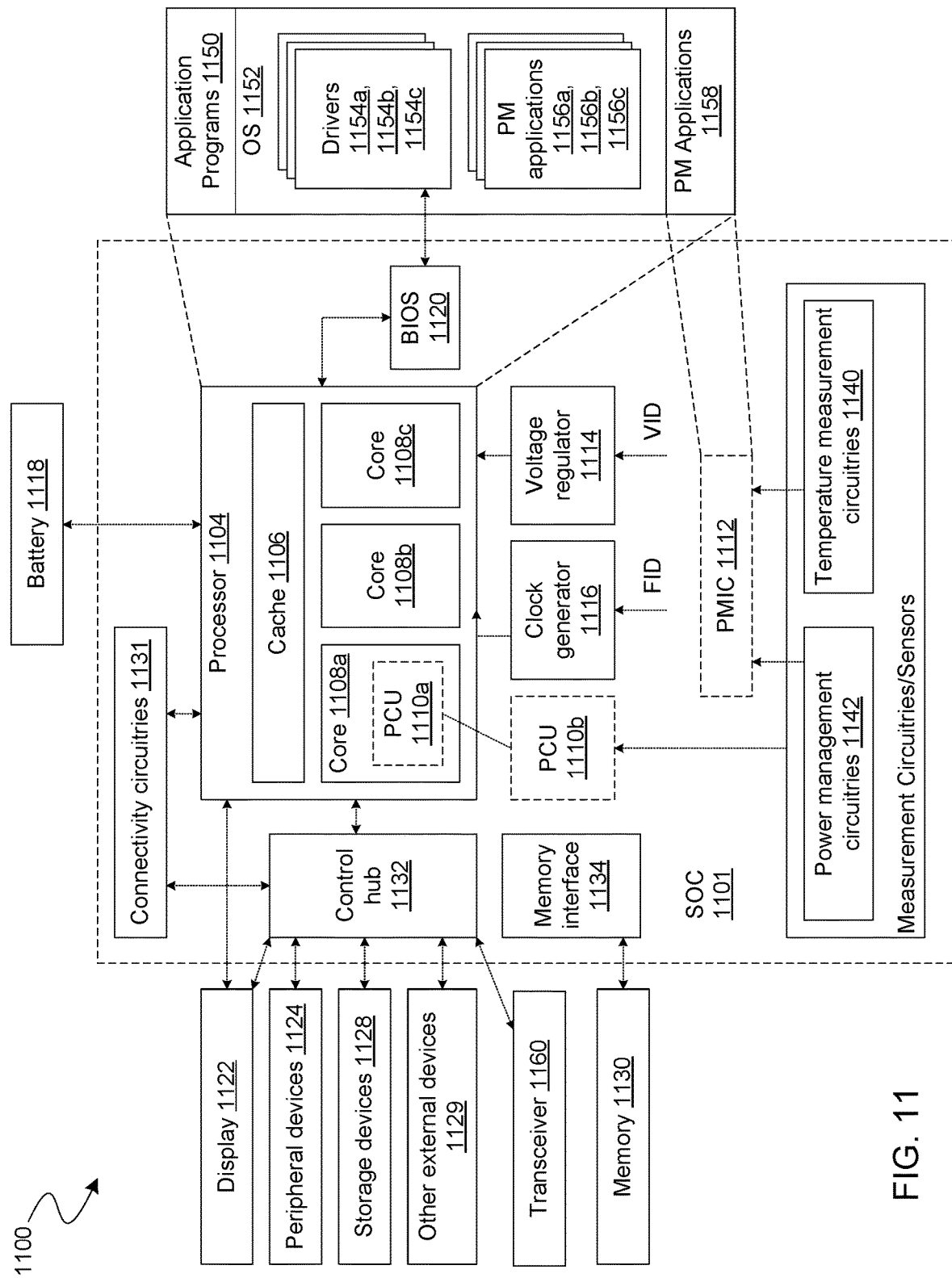
FIG. 11 illustrates a smart device or a computer system or an SoC (System-on-Chip) comprising a transceiver in accordance with some embodiments.

FIG. 11 illustrates a smart device or a computer system or an SoC (System-on-Chip) comprising a transceiver in accordance with some embodiments. It is pointed out that those elements of FIG. 11 having the same reference numbers (or names) as the elements of any other figure can operate or function in any manner similar to that described, but are not limited to such.

In some embodiments, device 1100 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 1100.

In an example, the device 1100 comprises a SoC (System-on-Chip) 1101. An example boundary of the SOC 1101 is illustrated using dotted lines in FIG. 11, with some example components being illustrated to be included within SOC 1101—however, SOC 1101 may include any appropriate components of device 1100.

In some embodiments, device 1100 includes processor 1104. Processor 1104 can include one or more physical devices, such as microprocessors, application processors, microcontrollers, programmable logic devices, processing cores, or other processing means. The processing operations performed by processor 1104 include the execution of an operating platform or operating system on which applications and/or device functions are executed. The processing operations include operations related to I/O (input/output) with a human user or with other devices, operations related to power management, operations related to connecting computing device 1100 to another device, and/or the like. The processing operations may also include operations related to audio I/O and/or display I/O.

In some embodiments, processor 1104 includes multiple processing cores (also referred to as cores) 1108a, 1108b, 1108c. Although merely three cores 1108a, 1108b, 1108c are illustrated in FIG. 11, the processor 1104 may include any other appropriate number of processing cores, e.g., tens, or even hundreds of processing cores. Processor cores 1108a, 1108b, 1108c may be implemented on a single integrated circuit (IC) chip. Moreover, the chip may include one or more shared and/or private caches, buses or interconnections, graphics and/or memory controllers, or other components.

In some embodiments, processor 1104 includes cache 1106. In an example, sections of cache 1106 may be dedicated to individual cores 1108 (e.g., a first section of cache 1106 dedicated to core 1108a, a second section of cache 1106 dedicated to core 1108b, and so on). In an example, one or more sections of cache 1106 may be shared among two or more of cores 1108. Cache 1106 may be split in different levels, e.g., level 1 (L1) cache, level 2 (L2) cache, level 3 (L3) cache, etc.

In some embodiments, a given processor core (e.g., core 1108a) may include a fetch unit to fetch instructions (including instructions with conditional branches) for execution by the core 1108a. The instructions may be fetched from any storage devices such as the memory 1130. Processor core 1108a may also include a decode unit to decode the fetched instruction. For example, the decode unit may decode the fetched instruction into a plurality of micro-operations. Processor core 1108a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 1108a (for example) may be an out-of-order processor core in one embodiment. Processor core 1108a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 1108a may also include a bus unit to enable communication between components of the processor core 1108a and other components via one or more buses. Processor core 1108a may also include one or more registers to store data accessed by various components of the core 1108a (such as values related to assigned app priorities and/or sub-system states (modes) association.

In some embodiments, device 1100 comprises connectivity circuitries 1131. For example, connectivity circuitries 1131 includes hardware devices (e.g., wireless and/or wired connectors and communication hardware) and/or software components (e.g., drivers, protocol stacks), e.g., to enable device 1100 to communicate with external devices. Device 1100 may be separate from the external devices, such as other computing devices, wireless access points or base stations, etc.

In an example, connectivity circuitries 1131 may include multiple different types of connectivity. To generalize, the connectivity circuitries 1131 may include cellular connectivity circuitries, wireless connectivity circuitries, etc. Cellular connectivity circuitries of connectivity circuitries 1131 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 1131 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 1131 may include a network interface, such as a wired or wireless interface, e.g., so that a system embodiment may be incorporated into a wireless device, for example, cell phone or personal digital assistant.

In some embodiments, device 1100 comprises control hub 1132, which represents hardware devices and/or software components related to interaction with one or more I/O devices. For example, processor 1104 may communicate with one or more of display 1122, one or more peripheral devices 1124, storage devices 1128, one or more other external devices 1129, etc., via control hub 1132. Control hub 1132 may be a chipset, a Platform Control Hub (PCH), and/or the like.

For example, control hub 1132 illustrates one or more connection points for additional devices that connect to device 1100, e.g., through which a user might interact with the system. For example, devices (e.g., devices 1129) that can be attached to device 1100 include microphone devices, speaker or stereo systems, audio devices, video systems or other display devices, keyboard or keypad devices, or other I/O devices for use with specific applications such as card readers or other devices.

As mentioned above, control hub 1132 can interact with audio devices, display 1122, etc. For example, input through a microphone or other audio device can provide input or commands for one or more applications or functions of device 1100. Additionally, audio output can be provided instead of, or in addition to display output. In another example, if display 1122 includes a touch screen, display 1122 also acts as an input device, which can be at least partially managed by control hub 1132. There can also be additional buttons or switches on computing device 1100 to provide I/O functions managed by control hub 1132. In one embodiment, control hub 1132 manages devices such as accelerometers, cameras, light sensors or other environmental sensors, or other hardware that can be included in device 1100. The input can be part of direct user interaction, as well as providing environmental input to the system to influence its operations (such as filtering for noise, adjusting displays for brightness detection, applying a flash for a camera, or other features).

In some embodiments, control hub 1132 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 1122 represents hardware (e.g., display devices) and software (e.g., drivers) components that provide a visual and/or tactile display for a user to interact with device 1100. Display 1122 may include a display interface, a display screen, and/or hardware device used to provide a display to a user. In some embodiments, display 1122 includes a touch screen (or touch pad) device that provides both output and input to a user. In an example, display 1122 may communicate directly with the processor 1104. Display 1122 can be one or more of an internal display device, as in a mobile electronic device or a laptop device or an external display device attached via a display interface (e.g., DisplayPort, etc.). In one embodiment display 1122 can be a head mounted display (HMD) such as a stereoscopic display device for use in virtual reality (VR) applications or augmented reality (AR) applications.

In some embodiments and although not illustrated in the figure, in addition to (or instead of) processor 1104, device 1100 may include Graphics Processing Unit (GPU) comprising one or more graphics processing cores, which may control one or more aspects of displaying contents on display 1122.

Control hub 1132 (or platform controller hub) may include hardware interfaces and connectors, as well as software components (e.g., drivers, protocol stacks) to make peripheral connections, e.g., to peripheral devices 1124.

It will be understood that device 1100 could both be a peripheral device to other computing devices, as well as have peripheral devices connected to it. Device 1100 may have a "docking" connector to connect to other computing devices for purposes such as managing (e.g., downloading and/or uploading, changing, synchronizing) content on device 1100. Additionally, a docking connector can allow device 1100 to connect to certain peripherals that allow computing device 1100 to control content output, for example, to audiovisual or other systems.

In addition to a proprietary docking connector or other proprietary connection hardware, device 1100 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 1131 may be coupled to control hub 1132, e.g., in addition to, or instead of, being coupled directly to the processor 1104. In some embodiments, display 1122 may be coupled to control hub 1132, e.g., in addition to, or instead of, being coupled directly to processor 1104.

In some embodiments, device 1100 comprises memory 1130 coupled to processor 1104 via memory interface 1134. Memory 1130 includes memory devices for storing information in device 1100. Memory can include nonvolatile (state does not change if power to the memory device is interrupted) and/or volatile (state is indeterminate if power to the memory device is interrupted) memory devices. Memory device 1130 can be a dynamic random access memory (DRAM) device, a static random access memory (SRAM) device, flash memory device, phase-change memory device, or some other memory device having suitable performance to serve as process memory. In one embodiment, memory 1130 can operate as system memory for device 1100, to store data and instructions for use when the one or more processors 1104 executes an application or process. Memory 1130 can store application data, user data, music, photos, documents, or other data, as well as system data (whether long-term or temporary) related to the execution of the applications and functions of device 1100.

Elements of various embodiments and examples are also provided as a machine-readable medium (e.g., memory 1130) for storing the computer-executable instructions (e.g., instructions to implement any other processes discussed herein). The machine-readable medium (e.g., memory 1130) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 1100 comprises temperature measurement circuitries 1140, e.g., for measuring temperature of various components of device 1100. In an example, temperature measurement circuitries 1140 may be embedded, or coupled or attached to various components, whose temperature are to be measured and monitored. For example, temperature measurement circuitries 1140 may measure temperature of (or within) one or more of cores 1108a, 1108b, 1108c, voltage regulator 1114, memory 1130, a mother-board of SOC 1101, and/or any appropriate component of device 1100.

In some embodiments, device 1100 comprises power measurement circuitries 1142, e.g., for measuring power consumed by one or more components of the device 1100. In an example, in addition to, or instead of, measuring power, the power measurement circuitries 1142 may measure voltage and/or current. In an example, the power measurement circuitries 1142 may be embedded, or coupled or attached to various components, whose power, voltage, and/or current consumption are to be measured and monitored. For example, power measurement circuitries 1142 may measure power, current and/or voltage supplied by one or more voltage regulators 1114, power supplied to SOC 1101, power supplied to device 1100, power consumed by processor 1104 (or any other component) of device 1100, etc.

In some embodiments, device 1100 comprises one or more voltage regulator circuitries, generally referred to as voltage regulator (VR) 1114. VR 1114 generates signals at appropriate voltage levels, which may be supplied to operate any appropriate components of the device 1100. Merely as an example, VR 1114 is illustrated to be supplying signals to processor 1104 of device 1100. In some embodiments, VR 1114 receives one or more Voltage Identification (VID) signals, and generates the voltage signal at an appropriate level, based on the VID signals. Various type of VRs may be utilized for the VR 1114. For example, VR 1114 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 1110a/b and/or PMIC 1112. In some embodiments, each core has a network of distributed LDOs to provide efficient control for power management. The LDOs can be digital, analog, or a combination of digital or analog LDOs.

In some embodiments, device 1100 comprises one or more clock generator circuitries, generally referred to as clock generator 1116. Clock generator 1116 generates clock signals at appropriate frequency levels, which may be supplied to any appropriate components of device 1100. Merely as an example, clock generator 1116 is illustrated to be supplying clock signals to processor 1104 of device 1100. In some embodiments, clock generator 1116 receives one or more Frequency Identification (FID) signals, and generates the clock signals at an appropriate frequency, based on the FID signals.

In some embodiments, device 1100 comprises battery 1118 supplying power to various components of device 1100. Merely as an example, battery 1118 is illustrated to be supplying power to processor 1104. Although not illustrated in the figures, device 1100 may comprise a charging circuitry, e.g., to recharge the battery, based on Alternating Current (AC) power supply received from an AC adapter.

In some embodiments, device 1100 comprises Power Control Unit (PCU) 1110 (also referred to as Power Management Unit (PMU), Power Controller, etc.). In an example, some sections of PCU 1110 may be implemented by one or more processing cores 1108, and these sections of PCU 1110 are symbolically illustrated using a dotted box and labelled PCU 1110a. In an example, some other sections of PCU 1110 may be implemented outside the processing cores 1108, and these sections of PCU 1110 are symbolically illustrated using a dotted box and labelled as PCU 1110b. PCU 1110 may implement various power management operations for device 1100. PCU 1110 may include hardware interfaces, hardware circuitries, connectors, registers, etc., as well as software components (e.g., drivers, protocol stacks), to implement various power management operations for device 1100.

In some embodiments, device 1100 comprises Power Management Integrated Circuit (PMIC) 1112, e.g., to implement various power management operations for device 1100. In some embodiments, PMIC 1112 is a Reconfigurable Power Management ICs (RPMICs) and/or an IMVP (Intel®

Mobile Voltage Positioning). In an example, the PMIC is within an IC chip separate from processor 1104. The PMIC 1112 may implement various power management operations for device 1100. PMIC 1112 may include hardware interfaces, hardware circuitries, connectors, registers, etc., as well as software components (e.g., drivers, protocol stacks), to implement various power management operations for device 1100.

In an example, device 1100 comprises one or both PCU 1110 or PMIC 1112. In an example, any one of PCU 1110 or PMIC 1112 may be absent in device 1100, and hence, these components are illustrated using dotted lines.

Various power management operations of device 1100 may be performed by PCU 1110, by PMIC 1112, or by a combination of PCU 1110 and PMIC 1112. For example, PCU 1110 and/or PMIC 1112 may select a power state (e.g., P-state) for various components of device 1100. For example, PCU 1110 and/or PMIC 1112 may select a power state (e.g., in accordance with the ACPI (Advanced Configuration and Power Interface) specification) for various components of device 1100. Merely as an example, PCU 1110 and/or PMIC 1112 may cause various components of the device 1100 to transition to a sleep state, to an active state, to an appropriate C state (e.g., C0 state, or another appropriate C state, in accordance with the ACPI specification), etc. In an example, PCU 1110 and/or PMIC 1112 may control a voltage output by VR 1114 and/or a frequency of a clock signal output by the clock generator, e.g., by outputting the VID signal and/or the FID signal, respectively. In an example, PCU 1110 and/or PMIC 1112 may control battery power usage, charging of battery 1118, and features related to power saving operation.

The clock generator 1116 can comprise a phase locked loop (PLL), frequency locked loop (FLL), or any suitable clock source. In some embodiments, each core of processor 1104 has its own clock source. As such, each core can operate at a frequency independent of the frequency of operation of the other core. In some embodiments, PCU 1110 and/or PMIC 1112 performs adaptive or dynamic frequency scaling or adjustment. For example, clock frequency of a processor core can be increased if the core is not operating at its maximum power consumption threshold or limit. In some embodiments, PCU 1110 and/or PMIC 1112 determines the operating condition of each core of a processor, and opportunistically adjusts frequency and/or power supply voltage of that core without the core clocking source (e.g., PLL of that core) losing lock when the PCU 1110 and/or PMIC 1112 determines that the core is operating below a target performance level. For example, if a core is drawing current from a power supply rail less than a total current allocated for that core or processor 1104, then PCU 1110 and/or PMIC 1112 can temporarily increase the power draw for that core or processor 1104 (e.g., by increasing clock frequency and/or power supply voltage level) so that the core or processor 1104 can perform at a higher performance level. As such, voltage and/or frequency can be increased temporality for processor 1104 without violating product reliability.

In an example, PCU 1110 and/or PMIC 1112 may perform power management operations, e.g., based at least in part on receiving measurements from power measurement circuitries 1142, temperature measurement circuitries 1140, charge level of battery 1118, and/or any other appropriate information that may be used for power management. To that end, PMIC 1112 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 1110 and/or PMIC 1112 in at least one embodiment to allow PCU 1110 and/or PMIC 1112 to manage processor core energy at least in part based on value(s) detected by one or more of the sensors.

Also illustrated is an example software stack of device 1100 (although not all elements of the software stack are illustrated). Merely as an example, processors 1104 may execute application programs 1150, Operating System 1152, one or more Power Management (PM) specific application programs (e.g., generically referred to as PM applications 1158), and/or the like. PM applications 11558 may also be executed by the PCU 1110 and/or PMIC 1112. OS 1152 may also include one or more PM applications 1156a, 1156b, 1156c. The OS 1152 may also include various drivers 1154a, 1154b, 1154c, etc., some of which may be specific for power management purposes. In some embodiments, device 1100 may further comprise a Basic Input/Output System (BIOS) 11520. BIOS 11520 may communicate with OS 11552 (e.g., via one or more drivers 11554), communicate with processors 11504, etc.

For example, one or more of PM applications 1158, 1156, drivers 1154, BIOS 11520, etc. may be used to implement power management specific tasks, e.g., to control voltage and/or frequency of various components of device 1100, to control wake-up state, sleep state, and/or any other appropriate power state of various components of device 1100, control battery power usage, charging of the battery 1118, features related to power saving operation, etc.

According to various embodiments, particular functional blocks of computer system 1100 are assigned to power domains. Each power domain may be provided with a voltage regulator 1114. According to various embodiments, the functional blocks in a power domain may be operated at a plurality of frequencies or a plurality of voltages. Temperature measurement circuitries 1140 measure a thermal condition of a voltage regulator 1114. In some embodiments, the measured thermal condition is provided to PCU 1110b. In some embodiments, the measured thermal condition is provided to PCU 1110a in core 1108a. The thermal condition of voltage regulator 1114 is evaluated by PCU 1110 with respect to a test criterion. An evaluation result or error value e(t) is generated by comparing each thermal condition reading with the test criterion.

PCU 1110 generates a control value. In various embodiments, the evaluation result or error value e(t) is input a proportional/integral/derivative (PID) control mechanism which generates the control value based on the input. The PID control mechanism includes proportional, integral, and derivative components, and a summing element that produces a weighted sum of the outputs of the three components to produce a control value or correction signal u(t).

PCU 1110 modifies the power used by a selected functional block. Power may be modified by reducing clock frequency, supply voltage, or both. To determine how much to adjust the clock frequency or voltage, a throttling ratio is applied to the control value generated by the PID control mechanism. The result may be either a clock or voltage signal adjustment parameter. In an embodiment, PCU 1110 modifies power of the selected functional block by providing a clock signal adjustment parameter to the clock generator providing a clock signal to the selected functional block. In an embodiment, PCU 1110 modifies power of the selected functional block by providing a voltage signal adjustment parameter to the VR providing a voltage signal to the selected functional block.

In some embodiments, device 1100 comprises a transceiver 1160, which may be coupled with control hub 1132. Transceiver 1160 can include either transmitter 300 or receiver 400, or both transmitter 300 and receiver 400. Transceiver 1160 may be coupled with a laser and a photo detector, which can be on a PIC, e.g., PIC 204. The laser and photo detector (not shown in FIG. 11) are connected to an optical link (also not shown in FIG. 11). Processor 1104, a data destination, or a data source may communicate with another computer system via control hub 1132 and transceiver 1160

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: sampling circuitry, coupled to photodetector circuitry, to generate a sample analog signal at a sample time based on an analog signal received from the photodetector circuitry; equalization circuitry, coupled to the sampling circuitry, comprising a plurality of memory elements to store sample analog signals, each having a tap, to generate an equalized signal, based on the sample analog signal, comprising first and second sample values corresponding with a cursor tap and a first postcursor tap, and one or more third sample values corresponding with taps other than the cursor tap and the first postcursor tap, wherein the third sample values are attenuated relative to the first and second sample values, and the first and second sample values correspond with two or more first symbols of a first alphabet; data slicer circuitry, coupled to the equalization circuitry, to generate a data signal and an error signal, each based on the equalized signal; and modulo circuitry, coupled to the data slicer circuitry, to perform a modulo operation on the two or more first symbols and to generate one or more second symbols, wherein the second symbols are according to a second alphabet.

Example 2. The apparatus of example 1, wherein the second symbols are according to a second alphabet, the first alphabet comprises a first number of symbols, the second alphabet comprises a second number of symbols, and the second number of symbols is less than the first number of symbols.

Example 3. The apparatus of example 1, wherein a weighting coefficient $a_0$ for the cursor tap equals one, and an impulse response $h_{FFE}(n)$ of the equalization circuitry is approximately equal to a function of a sum of terms comprising a term $\delta(n)$, $\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

Example 4. The apparatus of example 1, wherein the first sample value corresponding with the cursor tap has a first amplitude, the second sample value corresponding with the first postcursor tap has a second amplitude, and the first amplitude is substantially equal to the second amplitude.

Example 5. The apparatus of example 1, wherein the first sample value corresponding with the cursor tap has a first amplitude, and the sample values corresponding with taps other than the cursor tap and the first postcursor tap each have a corresponding amplitude, wherein each corresponding amplitude of the sample values corresponding with taps other than the cursor tap and the first postcursor tap is ten percent or less of the first amplitude.

Example 6. The apparatus of example 1, further comprising: clock and data recovery circuitry, coupled to the sampling circuitry, to generate sampling clock signals at sample times, wherein the sample times are offset from a center time of a symbol period to times at which a first amplitude of the first sample value corresponding with the cursor tap and a second amplitude of the second sample value corresponding with the first postcursor tap are substantially equal; and wherein a weighting coefficient $a_{-1}$ for the first postcursor tap equals zero, and an impulse response $h_{FFE}(n)$ of the equalization circuitry is approximately equal to a function of a sum of terms comprising a term $1*\delta(n)$, $1*\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

Example 7. The apparatus of example 6, wherein the clock and data recovery circuitry comprises: phase detector circuitry that operates according to a phase detector function $S(n)$ equal to a product of an error function $e(n)$; and a difference between a signal sample $x(n)$ and another signal sample $x(n-1)$, where n denotes a sequence number of a sample analog signal, wherein N is a positive integer.

Example 8. The apparatus of example 6, wherein the clock and data recovery circuitry comprises: a phase detector of a Mueller-Muller type having a parameter to adjust phase shift, wherein the phase detector is provided with a parameter value to adjust a phase shift so that sample times are at times at which an amplitude of the first sample value is substantially equal to an amplitude of the second sample value.

Example 9. The apparatus of example 1, wherein the one or more third sample values corresponding with taps other than the cursor tap and the first postcursor tap correspond with intersymbol interference (ISI).

Example 10. The apparatus of example 1, wherein a receiver of the apparatus comprises the sampling circuitry, the equalization circuitry, the data slicer circuitry, the modulo circuitry, and the photodetector circuitry.

Example 11. The apparatus of example 1, wherein a transmitter of the apparatus comprises a precoder, the precoder comprising a summing unit, precoder function calculation circuitry, and remainder determining circuitry, wherein: the summing unit comprises a first input to receive a symbol value and a second input to receive an output from the precoder function calculation circuitry; the remainder determining circuitry comprising an input to receive an output of the summing unit and to perform a modulo operation on the output of the summing unit; and the precoder function calculation circuitry comprises an input to receive an output of the remainder determining circuitry, the precoder circuitry to implement a precoder function equal to $A(z)$ minus 1.

Example 12. An apparatus comprising: photodetector circuitry to couple to an optical fiber, to receive a first photonic signal via the optical fiber, and to generate an analog signal based on the first photonic signal; sampling circuitry, coupled to the photodetector circuitry, to generate a first sampled signal based on the analog signal; data slicer circuitry, coupled to the sampling circuitry, to generate a first data signal and a first error signal each based on the first sampled signal, wherein the first data signal comprises first symbols according to a first alphabet; decoder circuitry, coupled to the data slicer circuitry, to generate a second data signal based on the first data signal and a decoder function; and modulo circuitry, coupled to the decoder circuitry, to perform modulo operations, based on the first symbols and to generate second symbols of the second data signal, wherein the second symbols are according to a second alphabet.

Example 13. The apparatus of example 12, wherein the first alphabet comprises a first number of symbols and the second alphabet comprises a second number of symbols, and the second number is one less than the first number.

Example 14. The apparatus of example 12, wherein a receiver of the apparatus comprises the sampling circuitry, the equalization circuitry, the data slicer circuitry, the modulo circuitry, and the photodetector circuitry.

Example 15. The apparatus of example 12, wherein a transmitter of the apparatus comprises a precoder, the precoder comprising a summing unit, precoder function calculation circuitry, and remainder determining circuitry, wherein: the summing unit comprises a first input to receive a symbol value and a second input to receive an output from the precoder function calculation circuitry; the remainder determining circuitry comprising an input to receive an output of the summing unit and to perform a modulo operation on the output of the summing unit; and the precoder function calculation circuitry comprises an input to receive an output of the remainder determining circuitry, the precoder circuitry to implement a precoder function.

Example 16. A system comprising: a processor and a memory to execute an operating system; a control hub coupled to the processor; a display device coupled to the control hub, the display device to display an image based on a display signal communicated to the display device; and a transceiver coupled to the control hub, the transceiver comprising: sampling circuitry to generate a sample analog signal, and equalization circuitry, coupled to sampling circuitry, the equalization circuitry comprising a plurality of memory elements to store sample analog signals, each having a tap, to generate an equalized signal based on the sample analog signal, the equalized signal comprising first and second sample values corresponding with a cursor tap and a first postcursor tap, and a plurality of third sample values corresponding with taps other than the cursor tap and the first postcursor tap, wherein a first amplitude of the first sample value and a second amplitude of the second sample value are substantially equal, and amplitudes of the plurality of third sample values are attenuated relative to the first and second sample values.

Example 17. The system of example 16, wherein the sampling circuitry is coupled to photodetector circuitry, the sampling circuitry is to generate the sample analog signal at a sample time based on an analog signal received from the photodetector circuitry, and wherein the first and second sample values correspond with two or more first symbols of a first alphabet, the system further comprising: data slicer circuitry, coupled to the equalization circuitry, to generate a data signal and an error signal, each based on the equalized signal; and modulo circuitry, coupled to the data slicer circuitry, to perform a modulo operation on the two or more first symbols and to generate one or more second symbols wherein the second symbols are according to a second alphabet.

Example 18. The system of example 17, wherein the first alphabet comprises a first number of symbols, the second alphabet comprises a second number of symbols, and the second number of symbols is less than the first number of symbols.

Example 19. The system of example 16, wherein a weighting coefficient $a_0$ for the cursor tap equals one, and an impulse response $h_{FFE}(n)$ of the equalization circuitry is approximately equal to a function of a sum of terms comprising a term $\delta(n)$, $\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

Example 20. The system of example 16, further comprising: clock and data recovery circuitry, coupled to the sampling circuitry, to generate sampling clock signals at sample times, wherein the sample times are offset from a center time of a symbol period to times at which a first amplitude of the first sample value corresponding with the cursor tap and a second amplitude of the second sample value corresponding with the first postcursor tap are substantially equal; and wherein a weighting coefficient a−1 for the first postcursor tap equals zero, and an impulse response hFFE(n) of the equalization circuitry is approximately equal to a function of a sum of terms comprising a term $1*\delta(n)$, $1*\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   sampling circuitry, coupled to photodetector circuitry, to generate a sample analog signal at a sample time based on an analog signal received from the photodetector circuitry;
   equalization circuitry, coupled to the sampling circuitry, comprising a plurality of memory elements to store sample analog signals, each having a tap, to generate an equalized signal, based on the sample analog signal, comprising first and second sample values corresponding with a cursor tap and a first postcursor tap, and one or more third sample values corresponding with taps other than the cursor tap and the first postcursor tap, wherein the third sample values are attenuated relative to the first and second sample values, and the first and second sample values correspond with two or more first symbols of a first alphabet;
   data slicer circuitry, coupled to the equalization circuitry, to generate a data signal and an error signal, each based on the equalized signal; and
   modulo circuitry, coupled to the data slicer circuitry, to perform a modulo operation on the two or more first symbols and to generate one or more second symbols, wherein the second symbols are according to a second alphabet.

2. The apparatus of claim 1, wherein the first alphabet comprises a first number of symbols, the second alphabet comprises a second number of symbols, and the second number of symbols is less than the first number of symbols.

3. The apparatus of claim 1, wherein a weighting coefficient $a_0$ for the cursor tap equals one, and an impulse response $h_{FFE}(n)$ of the equalization circuitry is approximately equal to a function of a sum of terms comprising a term $\delta(n)$, $\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

4. The apparatus of claim 1, wherein the first sample value corresponding with the cursor tap has a first amplitude, the second sample value corresponding with the first postcursor tap has a second amplitude, and the first amplitude is substantially equal to the second amplitude.

5. The apparatus of claim 1, wherein the first sample value corresponding with the cursor tap has a first amplitude, and the sample values corresponding with taps other than the cursor tap and the first postcursor tap each have a corresponding amplitude, wherein each corresponding amplitude of the sample values corresponding with taps other than the cursor tap and the first postcursor tap is ten percent or less of the first amplitude.

6. The apparatus of claim 1, further comprising:
   clock and data recovery circuitry, coupled to the sampling circuitry, to generate sampling clock signals at sample times, wherein the sample times are offset from a center time of a symbol period to times at which a first amplitude of the first sample value corresponding with the cursor tap and a second amplitude of the second sample value corresponding with the first postcursor tap are substantially equal; and
   wherein a weighting coefficient $a_{-1}$ for the first postcursor tap equals zero, and an impulse response $h_{FFE}(n)$ of the equalization circuitry is approximately equal to a function of a sum of terms comprising a term $1*\delta(n)$, $1*\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

7. The apparatus of claim 6, wherein the clock and data recovery circuitry comprises:
   phase detector circuitry that operates according to a phase detector function S(n) equal to a product of an error function e(n) and a difference between a signal sample x(n) and another signal sample x(n−1).

8. The apparatus of claim 6, wherein the clock and data recovery circuitry comprises:
   a phase detector of a Mueller-Muller type having a parameter to adjust phase shift, wherein the phase detector is provided with a parameter value to adjust a phase shift so that sample times are at times at which an amplitude of the first sample value is substantially equal to an amplitude of the second sample value.

9. The apparatus of claim 1, wherein the one or more third sample values corresponding with taps other than the cursor tap and the first postcursor tap correspond with intersymbol interference (ISI).

10. The apparatus of claim 1, wherein a receiver of the apparatus comprises the sampling circuitry, the equalization circuitry, the data slicer circuitry, the modulo circuitry, and the photodetector circuitry.

11. The apparatus of claim 1, wherein a transmitter of the apparatus comprises a precoder, the precoder comprising a summing unit, precoder function calculation circuitry, and remainder determining circuitry, wherein:
the summing unit comprises a first input to receive a symbol value and a second input to receive an output from the precoder function calculation circuitry; and
the remainder determining circuitry comprises an input to receive an output of the summing unit and is to perform a modulo operation on the output of the summing unit, wherein an output of the remainder determining circuitry is coupled to an input of the precoder function calculation circuitry.

12. An apparatus comprising:
sampling circuitry, coupled to photodetector circuitry, to generate a first sampled signal based on an analog signal;
data slicer circuitry, coupled to the sampling circuitry, to generate a first data signal and a first error signal each based on the first sampled signal, wherein the first data signal comprises first symbols according to a first alphabet;
decoder circuitry, coupled to the data slicer circuitry, to generate a second data signal based on the first data signal and a decoder function; and
modulo circuitry, coupled to the decoder circuitry, to perform modulo operations, based on the first symbols and to generate second symbols of the second data signal, wherein the second symbols are according to a second alphabet, wherein the first alphabet comprises a first number of symbols and the second alphabet comprises a second number of symbols, and the second number is one less than the first number.

13. The apparatus of claim 12, wherein the photodetector circuitry is coupled to an optical fiber to receive a first photonic signal via the optical fiber, and the photodetector circuitry is to generate an analog signal based on the first photonic signal.

14. The apparatus of claim 12, wherein a receiver of the apparatus comprises the sampling circuitry, equalization circuitry, the data slicer circuitry, the modulo circuitry, and the photodetector circuitry.

15. The apparatus of claim 12, wherein a transmitter of the apparatus comprises a precoder, the precoder comprising a summing unit, precoder function calculation circuitry, and remainder determining circuitry, wherein:
the summing unit comprises a first input to receive a symbol value and a second input to receive an output from the precoder function calculation circuitry;
the remainder determining circuitry comprises an input to receive an output of the summing unit and to perform a modulo operation on the output of the summing unit; and
the precoder function calculation circuitry comprises an input to receive an output of the remainder determining circuitry, the precoder function calculation circuitry to implement a precoder function.

16. A system comprising:
a processor and a memory to execute an operating system;
a control hub coupled to the processor;
a display device coupled to the control hub, the display device to display an image based on a display signal communicated to the display device; and
a transceiver coupled to the control hub, the transceiver comprising: sampling circuitry to generate a sample analog signal, and equalization circuitry, coupled to sampling circuitry, the equalization circuitry comprising a plurality of memory elements to store sample analog signals, each having a tap, to generate an equalized signal based on the sample analog signal, the equalized signal comprising first and second sample values corresponding with a cursor tap and a first postcursor tap, and a plurality of third sample values corresponding with taps other than the cursor tap and the first postcursor tap, wherein a first amplitude of the first sample value and a second amplitude of the second sample value are substantially equal, and amplitudes of the plurality of third sample values are attenuated relative to the first and second sample values.

17. The system of claim 16, wherein the sampling circuitry is coupled to photodetector circuitry, the sampling circuitry is to generate the sample analog signal at a sample time based on an analog signal received from the photodetector circuitry, and wherein the first and second sample values correspond with two or more first symbols of a first alphabet, the system further comprising:
data slicer circuitry, coupled to the equalization circuitry, to generate a data signal and an error signal, each based on the equalized signal; and
modulo circuitry, coupled to the data slicer circuitry, to perform a modulo operation on the two or more first symbols and to generate one or more second symbols wherein the second symbols are according to a second alphabet.

18. The system of claim 17, wherein the first alphabet comprises a first number of symbols, the second alphabet comprises a second number of symbols, and the second number of symbols is less than the first number of symbols.

19. The system of claim 16, wherein a weighting coefficient $a_0$ for the cursor tap equals one, and an impulse response $h_{FFE}(n)$ of the equalization circuitry is approximately equal to a function of a sum of terms comprising a term $\delta(n)$, $\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

20. The system of claim 16, further comprising:
clock and data recovery circuitry, coupled to the sampling circuitry, to generate sampling clock signals at sample times, wherein the sample times are offset from a center time of a symbol period to times at which a first amplitude of the first sample value corresponding with the cursor tap and a second amplitude of the second sample value corresponding with the first postcursor tap are substantially equal; and
wherein a weighting coefficient a-1 for the first postcursor tap equals zero, and an impulse response $h_{FFE}(n)$ of the equalization circuitry is approximately equal to a function of a sum of terms comprising a term $1*\delta(n)$, $1*\delta(n-1)$, and other terms, each of the other terms corresponding to a respective tap other than the cursor tap and the first postcursor tap, wherein $\delta$ represents a Dirac delta function, and wherein n is a sequence number of a signal of N sampled analog signals, wherein N is an positive integer.

* * * * *